(12) United States Patent
Bloomfield et al.

(10) Patent No.: US 10,843,093 B1
(45) Date of Patent: Nov. 24, 2020

(54) RIDE SYSTEMS HAVING DYNAMIC RIDE VEHICLE MOVEMENT

(71) Applicant: Universal City Studios LLC, Universal City, CA (US)

(72) Inventors: Andrew Evan Bloomfield, Orlando, FL (US); Kevin B. Primm, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/456,234

(22) Filed: Jun. 28, 2019

Related U.S. Application Data

(60) Provisional application No. 62/865,766, filed on Jun. 24, 2019.

(51) Int. Cl.
*A63G 31/16* (2006.01)
*G05B 15/02* (2006.01)
*A63G 31/02* (2006.01)

(52) U.S. Cl.
CPC .............. *A63G 31/16* (2013.01); *A63G 31/02* (2013.01); *G05B 15/02* (2013.01)

(58) Field of Classification Search
CPC .......... A63G 31/00; A63G 31/16; A63J 25/00
USPC ............... 472/59–61, 130, 131, 136, 95, 97; 434/29, 55
See application file for complete search history.

(56) References Cited

U.S. PATENT DOCUMENTS

| | | | |
|---|---|---|---|
| 5,403,238 A | 4/1995 | Baxter et al. | |
| 6,024,647 A | 2/2000 | Bennett et al. | |
| 9,084,941 B1* | 7/2015 | Fram | A63G 31/16 |
| 9,610,511 B1 | 4/2017 | Francis et al. | |
| 9,757,658 B1* | 9/2017 | Kaufmann | A63G 31/16 |
| 2016/0096114 A1* | 4/2016 | Van Winkle | A63G 7/00 472/59 |
| 2016/0271503 A1* | 9/2016 | De-Gol | A63J 25/00 |

FOREIGN PATENT DOCUMENTS

WO     2016176908 A1     11/2016

* cited by examiner

*Primary Examiner* — Kien T Nguyen
(74) *Attorney, Agent, or Firm* — Fletcher Yoder, P.C.

(57) ABSTRACT

A ride system includes ride vehicles. Each ride vehicle includes a rider support configured to carry a rider, a support actuator coupled to the rider support and a base of the ride vehicle and configured to move the rider support relative to the base, and a ride vehicle movement system integrated with the base and configured to move the ride vehicle relative to a ride area. The ride system also includes a controller configured to control the support actuator and the ride vehicle movement system of each ride vehicle individually based on a choreographed routine and an input received from a selected ride vehicle. The input is indicative of an adjustment to the support actuator, the ride vehicle movement system, or both, of each ride vehicle. The input is based on a correlative adjustment to the support actuator, the ride vehicle movement system, or both, of the selected ride vehicle.

19 Claims, 15 Drawing Sheets

RIDE SYSTEMS HAVING DYNAMIC RIDE VEHICLE MOVEMENT

CROSS-REFERENCE TO RELATED APPLICATIONS

This application claims priority from and the benefit of U.S. Provisional Application Ser. No. 62/865,766, entitled "RIDE SYSTEMS HAVING DYNAMIC RIDE VEHICLE MOVEMENT," filed Jun. 24, 2019, which is hereby incorporated by reference.

BACKGROUND

The present disclosure relates generally to ride systems. More specifically, embodiments of the present disclosure relate to ride systems having ride vehicles that may move about a coordinated ride path in multiple directions relative to one another. The movement of the ride vehicles may be dynamically adjusted based on received inputs, such as inputs provided by riders of the ride vehicles.

Some ride vehicles are ridden by users for transportation and/or entertainment purposes. For example, some amusement rides and other structured ride systems include ride vehicles that move in patterns along fixed paths. During operation, the movement of the ride vehicles is typically restricted to the fixed paths. It is now recognized that such movement of the ride vehicles may detract from the users' experiences while riding the ride vehicles.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed embodiments are summarized below. These embodiments are not intended to limit the scope of the claimed embodiments, but rather these embodiments are intended only to provide a brief summary of possible forms of the claimed embodiments. Indeed, the present disclosure may encompass a variety of forms that may be similar to or different from the embodiments set forth below.

In an embodiment, a ride system includes a plurality of ride vehicles. Each ride vehicle of the plurality of ride vehicles includes a rider support configured to carry a rider, a support actuator coupled to the rider support and a base of the ride vehicle, and a ride vehicle movement system integrated with the base and configured to move the ride vehicle relative to a ride area, where the support actuator is configured to move the rider support relative to the base. The ride system also includes a controller configured to control the support actuator and the ride vehicle movement system of each ride vehicle of the plurality of ride vehicles individually based at least in part on instructions, stored in memory, for performing a choreographed routine of the plurality of ride vehicles, and an input received from a selected ride vehicle of the plurality of ride vehicles. The input is indicative of an adjustment to the support actuator of each ride vehicle of the plurality of ride vehicles, the ride vehicle movement system of each ride vehicle of the plurality of ride vehicles, or both, and the input is based on a correlative adjustment to the support actuator of the selected ride vehicle, the ride vehicle movement system of the selected ride vehicle, or both.

In an embodiment, a ride system includes one or more ride vehicles. Each ride vehicle of the one or more ride vehicles includes a rider support configured to carry a rider, a support actuator coupled to the rider support and to a base of the ride vehicle, a ride vehicle movement system coupled to the base and configured to move the ride vehicle to traverse a ride area, and a roll system configured to move the rider support or the base angularly relative to the ride area. The support actuator is configured to move the rider support relative to the base.

In an embodiment, a ride system includes a track and a ride vehicle configured to travel along the track. The ride vehicle includes a plurality of rider supports, where each rider support of the plurality of rider supports is configured to carry a respective rider. The ride vehicle also includes a plurality of support actuators, where each support actuator is coupled to a respective rider support of the plurality of rider supports and a base of the ride vehicle, and each support actuator is configured to move the respective rider support relative to the base. Additionally, the ride vehicle includes a ride vehicle movement system integrated with the base and configured to move the ride vehicle along the track and a roll system configured to move the base and the plurality of rider supports angularly relative to the track. Further, the ride system includes a controller configured to control the plurality of support actuators, the ride vehicle movement system, and the roll system of the ride vehicle based at least in part on instructions, stored in memory, for performing a choreographed routine of the plurality of rider supports and an input received from a selected rider support of the plurality of rider supports, where the input is indicative of an adjustment to each support actuator of the plurality of support actuators, and the input is based on a correlative adjustment to the support actuator coupled to the selected rider support.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
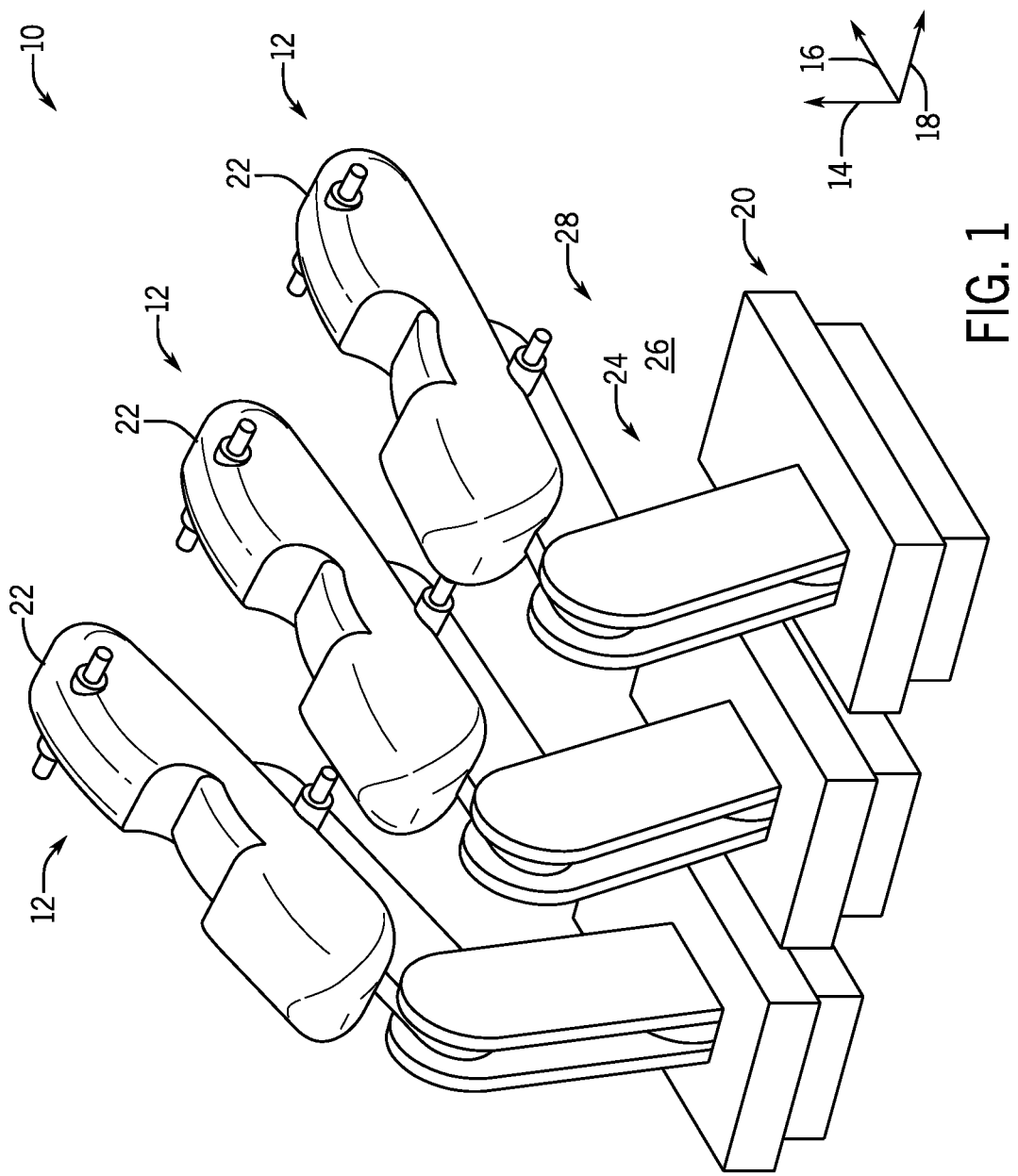
FIG. 1 is a rear perspective view of an embodiment of a ride system including ride vehicles, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain ride systems include ride vehicles that may carry riders (e.g., users) within ride areas of the ride systems. Embodiments of the present disclosure are directed to ride vehicles that may move within a ride area of a ride system based on a choreographed routine. For example, the ride system may include multiple ride vehicles that may carry riders within the ride area to entertain and/or transport the riders. Movement of the ride vehicles may be choreographed along ride paths and/or with respect to one another and other portions of the ride system. Additionally, the ride vehicles may move in certain directions relative to a ride area of the ride system, and/or may include rider supports that may carry the riders and move relative to the ride area of the ride system and/or other portions of the ride vehicles. For example, the ride vehicles may include mechanisms and portions (e.g., the rider supports) that may move vertically with respect to a surface of the ride area and/or with respect to a base of the ride vehicle, horizontally in various directions (e.g., may move in any planar direction, may spin, may turn, and so forth), and that may roll (e.g., lean and/or move angularly with respect to the surface of the ride area and/or with respect to the base of the ride vehicle).

In certain embodiments, the ride system and/or the ride vehicles may include a control system that controls movement of the ride vehicles within the ride area. For example, based on a position of a ride vehicle with respect to a ride path (e.g., based on an actual position of the ride vehicle relative to an intended position of the ride vehicle along the ride path), the control system may adjust a trajectory or traveled course of the ride vehicle. In certain embodiments, as the ride vehicle travels within the ride area, certain factors may affect the trajectory of the ride vehicle, such as obstacles within the ride area, a weight of the rider on the ride vehicle, a weight of other items disposed on or part of the ride vehicle, obstructions attached to the ride vehicle that may be dragging behind, in front of, or to the side of the ride vehicle, rider inputs (e.g., a rider shifting their weight, a rider turning a steering wheel or adjusting the trajectory of the ride vehicle generally, a rider adjusting a speed of the ride vehicle, etc.). As such, the control system may adjust the trajectory or the traveled course of the ride vehicle to generally follow the ride path and to account for such factors.

In certain embodiments, the ride vehicles of the ride system may include a selected ride vehicle configured to lead the other ride vehicles. A rider riding the selected ride vehicle may provide an input, such as by shifting their weight, controlling a joystick or other hand controller, pressing a button, or a combination thereof. Based on the rider input, a controller of the selected ride vehicle and/or of the ride system may adjust the trajectory of the selected ride vehicle and/or movement of the rider support of the selected ride vehicle. For example, if the rider of the selected ride vehicle provides an input indicative of pulling the rider support of the selected ride vehicle upwardly and leaning the rider support toward the left, the controller may adjust the movement of the selected ride vehicle from the planned and choreographed ride path to generally move the rider support upwardly and to the left. Additionally, the ride system controller may adjust the movement of some or all of the other ride vehicles and/or the rider supports of the other ride vehicles within the ride system. The adjustments to the movements of the other ride vehicles may generally correspond to the movement of the selected ride vehicle (e.g., may be based on a correlative adjustment/movement of the selected ride vehicle or portions thereof), may mirror the movement of the selected ride vehicle, and/or may be of a varying/different degree relative to the movement of the selected ride vehicle. In certain embodiments, the designation of the selected ride vehicle among the ride vehicles of the ride system may change during operation of the ride system. For example, in a first time period during a ride sequence of the ride system (e.g., a time sequence of operation of the ride system), the selected ride vehicle may be a first ride vehicle, and in a second time period during the ride sequence, the selected ride vehicle may be a second, different ride vehicle. As such, the ride system allows the one or multiple riders of the ride system to at least partially control the ride vehicles during the ride sequence and while the riders ride the ride vehicles. The ride system may dynamically adjust the movement of the ride vehicles based on the rider input.

In certain embodiments, the ride system may include a display system configured to provide a viewing experience that generally corresponds to the movement of the ride vehicles. For example, the viewing experience may be a cinematic presentation that may be viewed by the riders while the riders ride the ride vehicles, and that may enhance the experience of the riders. The graphics of the cinematic presentation may generally move/change to correspond to the choreographed movement of the ride vehicles. In certain embodiments, the input provided to the selected ride vehicle and/or other ride vehicles may adjust the cinematic presentation. For example, the cinematic presentation may be part of a storyline experienced by the riders, and the input provided at the ride vehicles may alter/adjust the storyline (e.g., may choose a particular storyline from multiple possible storylines). In certain embodiments, the ride system may also include an auditory system configured to provide an auditory experience (e.g., sound effects, music, etc.) that generally corresponds to the choreographed movement of the ride vehicles and/or that may be adjusted based on the input provided at the ride vehicles.

In certain embodiments, the ride system may include a ride station configured to dock/accommodate the ride vehicles. The ride system may dispatch some or all of the ride vehicles from the ride station during operation. For example, the number of ride vehicles dispatched from the ride station may generally depend on a party size (e.g., one rider, two riders, three riders, four riders, six riders, ten riders, etc.) that is riding, or are about to ride, the ride vehicles of the ride system.

In certain embodiments, the ride system may include a ride vehicle configured to move along a fixed track and that includes one or multiple rider supports configured to be ridden by multiple riders. For example, each rider support may be coupled to a base of the ride vehicle, and the base may move along the track. Each rider support may move relative to the base and relative to one another as the ride vehicle moves along the track. The movement of each rider support may be planned and/or choreographed based on the position of the ride vehicle along the track. Additionally, the ride vehicle may include a selected rider support configured to receive an input from a rider, and a controller of the ride system may control the movement of the selected rider support and/or other rider supports of the ride vehicle based on the input, such as by adjusting the planned and/or choreographed movement of the rider supports. Accordingly, the embodiments of the ride systems described herein may provide an entertaining and interactive experience for the riders of the ride systems.

Turning to the drawings, FIG. 1 is a rear perspective view of an embodiment of a ride system 10 including ride vehicles 12. To facilitate discussion, each ride vehicle 12 and certain components of the ride vehicles 12 may be described with reference to a vertical axis or direction 14, a longitudinal axis or direction 16, and a lateral axis or direction 18. As illustrated, in certain embodiments, each ride vehicle 12 includes a base 20 and a rider support 22 (e.g., a riding assembly) coupled to the base 20 via a linkage assembly 24. The base 20 may move the ride vehicle 12 along a ride path and/or along a surface 26 of a ride area 28 of the ride system 10, and the rider support 22 may carry a rider (e.g., a user) of the ride vehicle 12. For example, the rider may ride the ride vehicle 12 for entertainment and/or transportation purposes. In certain embodiments, the rider support 22 and/or the ride vehicle 12 may include ornamental features that enhance the rider's experience, such as features resembling an animal, a fictional character, an automobile, decorations, and/or other objects. While the illustrated embodiment of the ride system 10 includes three ride vehicles 12, certain embodiments of the ride system 10 may include more or fewer ride vehicles 12 (e.g. one ride vehicle 12, two ride vehicles 12, four ride vehicles 12, five ride vehicles 12, eight ride vehicles 12, etc.). Additionally, in certain embodiments, the ride vehicles 12 may share a common base 20. For example, the common base 20 may be significantly wider than the illustrated bases 20 of FIG. 1 such that the common base 20 may accommodate multiple rider supports 22 and multiple linkage assemblies 24.

During operation of the ride system 10, the riders may sit on the rider supports 22 of the ride vehicles 12, and the ride vehicles 12 may traverse the surface 26 of the ride area 28 of the ride system 10 via the respective bases 20. As described in greater detail below, in certain embodiments, each ride vehicle 12 may move along a choreographed ride path within the ride system 10 (e.g., along the surface 26 of the ride area 28) and/or may include mechanisms that enable the ride vehicles 12 and/or the rider supports 22 to move vertically (e.g., generally along the vertical axis 14), to move horizontally (e.g., generally along the longitudinal axis 16 and/or the lateral axis 18), and to roll while moving along the ride path (e.g., to rotate generally about the longitudinal axis 16 and/or the lateral axis 18). Additionally, each rider may at least partially control/alter the movement of the ride vehicles 12 and/or the rider supports 22. The movement of the ride vehicles 12 along the choreographed ride path, in the various directions while moving along the ride path, and the ability of the riders to at least partially control the movements of the ride vehicles 12 and/or the rider supports 22 may provide an interactive and entertaining experience for the riders.

Figure 2:
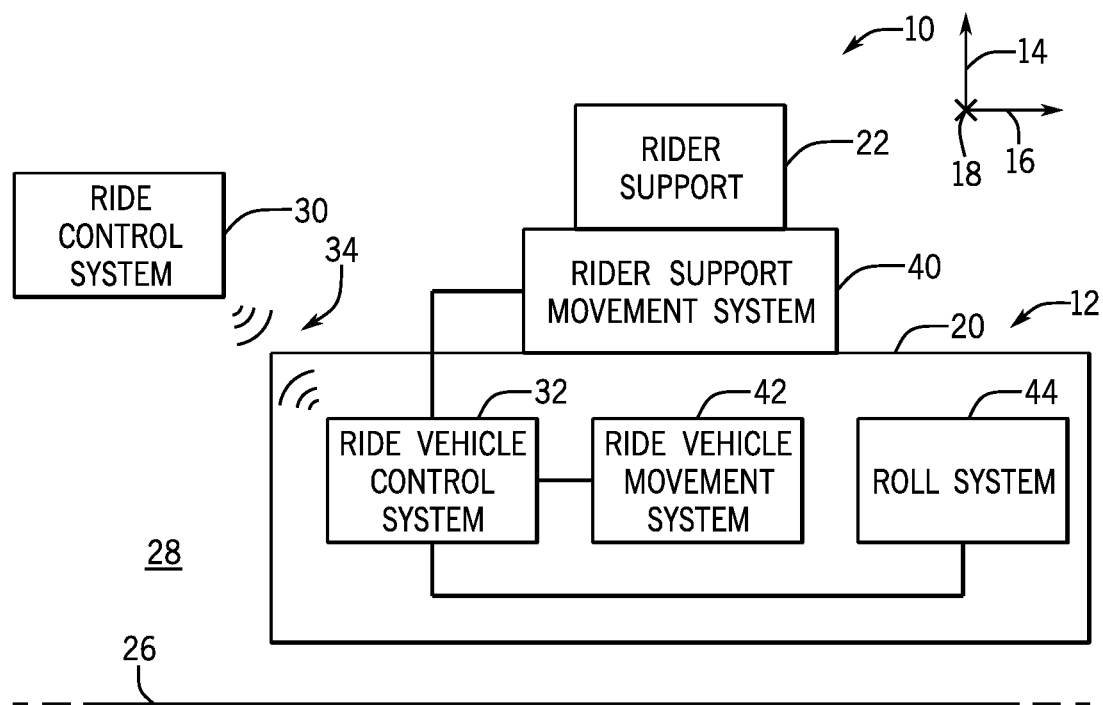
FIG. 2 is a block diagram of an embodiment of the ride system of FIG. 1, in accordance with an aspect of the present disclosure.

FIG. 2 is a block diagram of an embodiment of the ride system 10 of FIG. 1 including the ride vehicle 12. The ride system 10 includes a ride control system 30 in communication with a ride vehicle control system 32 of the ride vehicle 12. As illustrated, the ride control system 30 and the ride vehicle control system 32 are communicatively coupled via a wireless connection 34 (e.g., Wi-Fi, Bluetooth, etc.). In certain embodiments, the ride control system 30 and the ride vehicle control system 32 may be communicatively coupled via a wired connection (e.g., Ethernet, universal serial bus (USB), CANbus, ISObus, etc.).

The ride vehicle 12 includes a rider support movement system 40 (e.g., a riding assembly movement system), a ride vehicle movement system 42, and a roll system 44 communicatively coupled to the ride vehicle control system 32, such that the ride vehicle control system 32 may control the rider support movement system 40, the ride vehicle movement system 42, and the roll system 44. In certain embodiments, the rider support movement system 40, the ride vehicle movement system 42, and/or the roll system 44 may be directly communicatively coupled to the ride control system 30, such that the ride control system 30 may control the rider support movement system 40, the ride vehicle movement system 42, and/or the roll system 44.

The rider support movement system 40 may move the rider support 22 with respect to the base 20 and/or along the vertical axis 14 and/or the longitudinal axis 16. In certain embodiments, the ride vehicle movement system 42 may move the ride vehicle 12 along the surface 26 of the ride area 28 of the ride system 10 generally along the longitudinal axis 16 and/or the lateral axis 18. For example, the ride vehicle movement system 42 may move the ride vehicle 12 in any planar direction (e.g., along a plane parallel to the surface 26 of the ride area 28), may turn the ride vehicle 12, and may spin the ride vehicle 12. The roll system 44 may roll or angle the ride vehicle 12 (e.g., move the ride vehicle 12 generally angularly and/or tilt the ride vehicle 12) and/or the rider support 22 relative to the surface 26 of the ride area 28 of the ride system 10 and generally about the longitudinal axis 16.

As such, the ride vehicle control system 32 may control the rider support movement system 40, the ride vehicle movement system 42, and the roll system 44 individually (e.g., separately, independently, and/or differently) as the ride vehicle 12 moves within the ride system 10 to move the rider seated on the rider support 22. By moving the rider as the ride vehicle 12 travels along the ride path within the ride system 10, the ride vehicle 12 may provide an entertaining experience for the rider that simulates movement of an animal, a fictional character, an automobile, and/or other entertaining systems or characters. Each of the rider support movement system 40, the ride vehicle movement system 42, and the roll system 44 may be coupled to and/or at least partially integrated with the base 20 of the ride vehicle 12.

Figure 3:
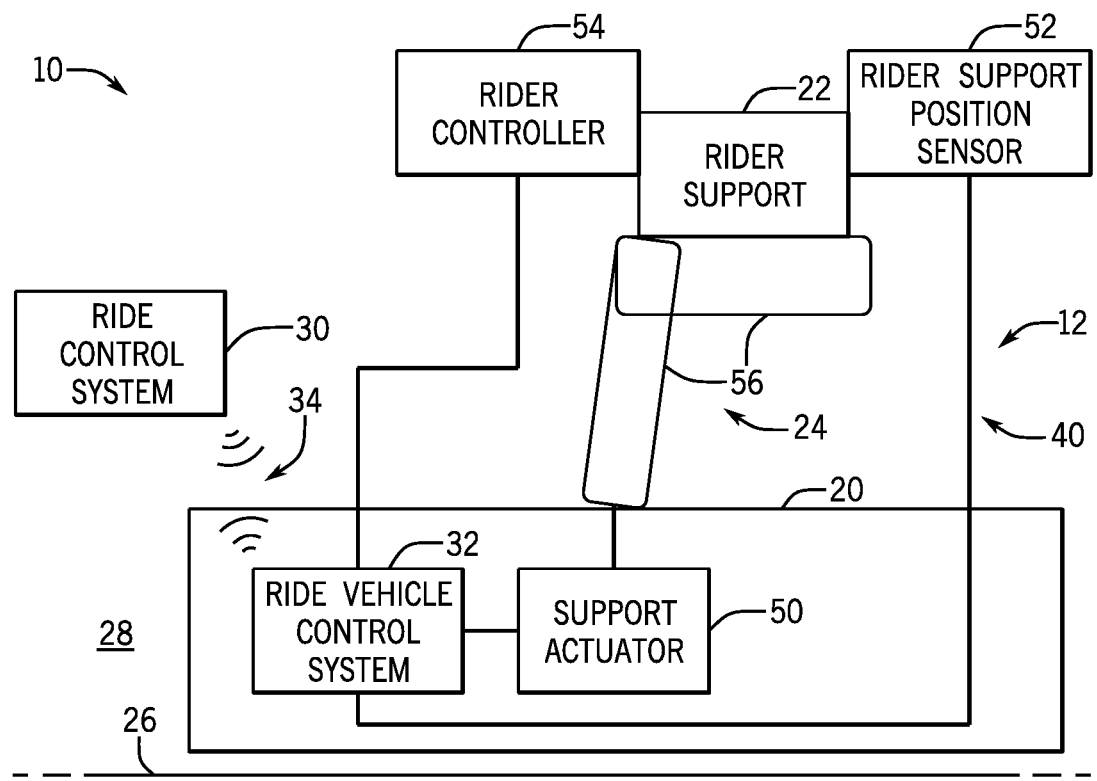
FIG. 3 is a block diagram of an embodiment of the ride system of FIG. 1 including a rider support movement system, in accordance with an aspect of the present disclosure.

FIG. 3 is a block diagram of an embodiment of the ride system 10 of FIG. 1 including the rider support movement system 40 of the ride vehicle 12. As described above, the rider support movement system 40 may move the rider support 22 generally along the vertical axis 14 and/or along the longitudinal axis 16. Additionally, the rider support movement system 40 may move the rider support 22 with respect to the base 20 and/or the surface 26 of the ride area 28 of the ride system 10. As illustrated, the rider support movement system 40 includes the linkage assembly 24, a support actuator 50, a rider support position sensor 52, and a rider controller 54. The support actuator 50 is configured to actuate to cause the linkage assembly 24 to move the rider support 22 relative to the base 20 and/or the surface 26 of the ride area 28. For example, the support actuator 50 may be a piston, a hydraulic cylinder, a pneumatic cylinder, another suitable actuator, or the like, and may be coupled to the linkage assembly 24. After actuation by the support actuator 50, the linkages 56 of the linkage assembly 24 may rotate relative to one another (e.g., via a pivot point at which the linkages 56 are coupled) to cause the rider support 22 to move relative to the base 20 and/or the surface 26 of the ride area 28. For example, a first linkage 56 may be coupled to the support actuator 50 and to a second linkage 56. The support actuator 50 may move the first linkage 56, which may cause movement of the second linkage 56 and the rider support 22. In certain embodiments, the linkage assembly 24 may include additional mechanisms to enable/cause the movement of the rider support 22 generally along the vertical axis 14 and/or along the longitudinal axis 16, such as a pin connecting the linkages 56, an additional actuator coupled to and/or configured to move both the linkages 56, and other suitable mechanisms. In certain embodiments, the vertical and/or longitudinal motion caused by the rider support movement system 40 may be combined with the movement caused by the ride vehicle movement system 42 and/or the roll movement caused by the roll system 44. In certain embodiments, the rider support movement system 40 may include movement mechanisms in addition to or in place of the linkage assembly 24 and/or the support actuator 50 configured to move the rider support 22 relative to the base 20 and/or the surface 26 of the ride area 28.

The rider support position sensor 52 may output a signal indicative of a vertical and/or longitudinal position of the rider support 22 relative to the base 20 and/or the surface 26 of the ride area 28. For example, the rider support position sensor 52 may sense a position of the rider support 22 along the vertical axis 14, along the longitudinal axis 16, relative to the base 20, and/or relative to the surface 26 of the ride area 28, and may output the signal indicative of the vertical and/or longitudinal position of the rider support 22. The ride vehicle control system 32 may receive the signal indicative of the vertical and/or longitudinal position of the rider support 22 from the rider support position sensor 52. Based on the position of the rider support 22, the ride vehicle control system 32 may adjust the vertical and/or longitudinal position of the rider support 22 relative to the base 20 and/or the surface 26 of the ride area 28. For example, the ride vehicle control system 32 may output a signal to the support actuator 50 to actuate to cause the linkage assembly 24 to move the rider support 22. In certain embodiments, the support actuator 50 may be omitted or may be integral to the linkage assembly 24, such that the ride vehicle control system 32 may communicate directly with the linkage assembly 24 to cause the linkage assembly 24 to move the rider support 22.

Additionally, the ride control system 30 may communicate directly with the linkage assembly 24, or portions thereof, to control the movement of the rider support 22. In certain embodiments, the ride control system 30 may control vertical and/or longitudinal movement of the rider support 22 of the ride vehicle 12 based on respective positions of other rider supports 22 of other ride vehicles 12. For example, based on another rider support 22 of another, separate ride vehicle 12 being at a first position, the ride control system 30 may control the movement/position of the rider support 22 of the ride vehicle 12. As such, the ride control system 30 may control the movement/position of the rider support 22 of each ride vehicle 12 individually (e.g., independently, separately, and/or differently).

As illustrated, the rider controller 54 is coupled to the rider support 22 and communicatively coupled to the ride vehicle control system 32. The rider controller 54 may be any suitable controller configured to receive an input from the rider indicative of adjustment to the movement and/or position of the rider support 22, such as a joystick, a gaming controller, or another type of hand controller. In certain embodiments, the rider controller 54 may be integral to the rider support 22, such as included in handlebars of the rider support 22 (e.g., the rider may provide an input by moving the handlebars, by pressing button(s) on the handlebars, or turning certain mechanisms of the handlebars), included in a body of the rider support 22 (e.g., the rider may shift their weight to provide an input), or incorporated into the rider support 22 in other manners. For example, the rider controller 54, or the ride vehicle 12 generally, may include sensors configured to detect the rider shifting their weight while positioned on the rider support 22, such as inertial sensors, accelerometers, pressure sensors, and/or other sensors configured to detect a shift in weight and/or a shift in weight distribution. As such, the rider controller 54 may provide an interactive experience for a rider positioned on the rider support 22 by allowing the rider to at least partially control the movement/position of the rider support 22 and/or the ride vehicle 12.

Figure 4:
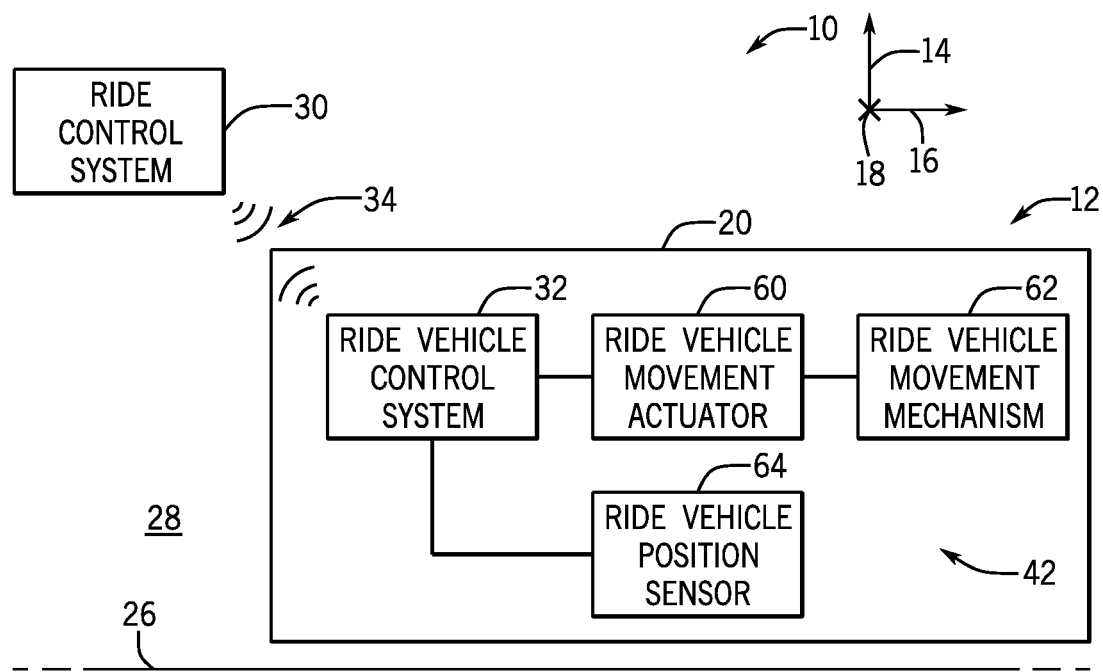
FIG. 4 is a block diagram of a side view of an embodiment of the ride system of FIG. 1 including a ride vehicle movement system, in accordance with an aspect of the present disclosure.

FIG. 4 is a block diagram of a side view of an embodiment of the ride system 10 of FIG. 1 including the ride vehicle movement system 42 of the ride vehicle 12. As described above, the ride vehicle movement system 42 may move the ride vehicle 12 generally along the longitudinal axis 16 and/or the lateral axis 18 and in any planar direction. The ride vehicle movement system 42 may also turn and/or spin the ride vehicle 12 along the surface 26 of the ride area 28 of the ride system 10. In certain embodiments, the ride vehicle movement system 42 may turn the ride vehicle 12 in a first direction while spinning the ride vehicle 12 in a second direction. For example, the ride vehicle movement system 42 may turn the ride vehicle 12 toward the left while spinning the ride vehicle 12 to the right (e.g., while spinning the ride vehicle 12 clockwise if viewed from a top view).

As illustrated, the ride vehicle movement system 42 includes a ride vehicle movement actuator 60, a ride vehicle movement mechanism 62, and a ride vehicle position sensor 64. The ride vehicle movement actuator 60 may actuate to cause the ride vehicle movement mechanism 62 to move the ride vehicle 12. For example, the ride vehicle movement actuator 60 may be a piston, a hydraulic cylinder, a pneumatic cylinder, another suitable actuator, and the like, and may be coupled to the ride vehicle movement mechanism 62. After actuation by the ride vehicle movement actuator 60, the ride vehicle movement mechanism 62 may rotate, turn, or perform any other suitable movement to cause the ride vehicle 12 to move along the surface 26 of the ride area 28 of the ride system 10. For example, the ride vehicle movement mechanism 62 may be wheels, spheres (e.g., steel or rubber balls), a track system, another suitable movement mechanism, or a combination thereof. In certain embodiments, the ride vehicle 12 may include more or fewer ride vehicle movement mechanisms 62 (e.g., two ride vehicle movement mechanisms 62, three ride vehicle movement mechanisms 62, five ride vehicle movement mechanisms 62, etc.) configured to move the ride vehicle 12 along the surface 26 of the ride area 28. In certain embodiments, the motion caused by the ride vehicle movement system 42 may be combined with the rider support movement caused by the rider support movement system 40. For example, while the rider support 22 moves relative to the base 20 and/or the surface 26 of the ride area 28, the ride vehicle movement system 42 may turn, spin, or otherwise move the ride vehicle 12 along the surface 26 of the ride area 28 of the ride system 10.

The ride vehicle position sensor 64 may output a signal indicative of a position of the ride vehicle 12 within the ride system 10. For example, the ride vehicle position sensor 64 may sense a position of the ride vehicle 12 along the longitudinal axis 16, along the lateral axis 16, relative to another ride vehicle 12, relative to a ride path, relative to other portions of the ride system 10, along the surface 26 of the ride area 28, or the like, and output the signal indicative of the position of the ride vehicle 12. The ride vehicle control system 32 may receive the signal indicative of the position of the ride vehicle 12 from the ride vehicle position sensor 64. Based on the ride vehicle position of the ride vehicle 12, the ride vehicle control system 32 may adjust a trajectory (e.g., a course) of the ride vehicle 12 along the surface 26 of the ride area 28 of the ride system 10. For example, the ride vehicle control system 32 may output a signal to the ride vehicle movement actuator 60 to actuate and cause the ride vehicle movement mechanism 62 to move the ride vehicle 12 along the surface 26 of the ride area 28. In certain embodiments, the ride vehicle movement actuator 60 may be omitted or may be integral to the ride vehicle movement mechanism 62, such that the ride vehicle control system 32 may communicate directly with the ride vehicle movement mechanism 62 to cause the ride vehicle movement mechanism 62 to move the ride vehicle 12. Additionally, the ride control system 30 may communicate directly with the ride vehicle movement system 42, or portions thereof, to control the movement of the ride vehicle 12 along the surface 26 of the ride area 28. The ride control system 30 may control the ride vehicle movement mechanism 62 of each ride vehicle 12 individually (e.g., independently, separately, and/or differently) to control the surface movement of each ride vehicle 12.

Figure 5:
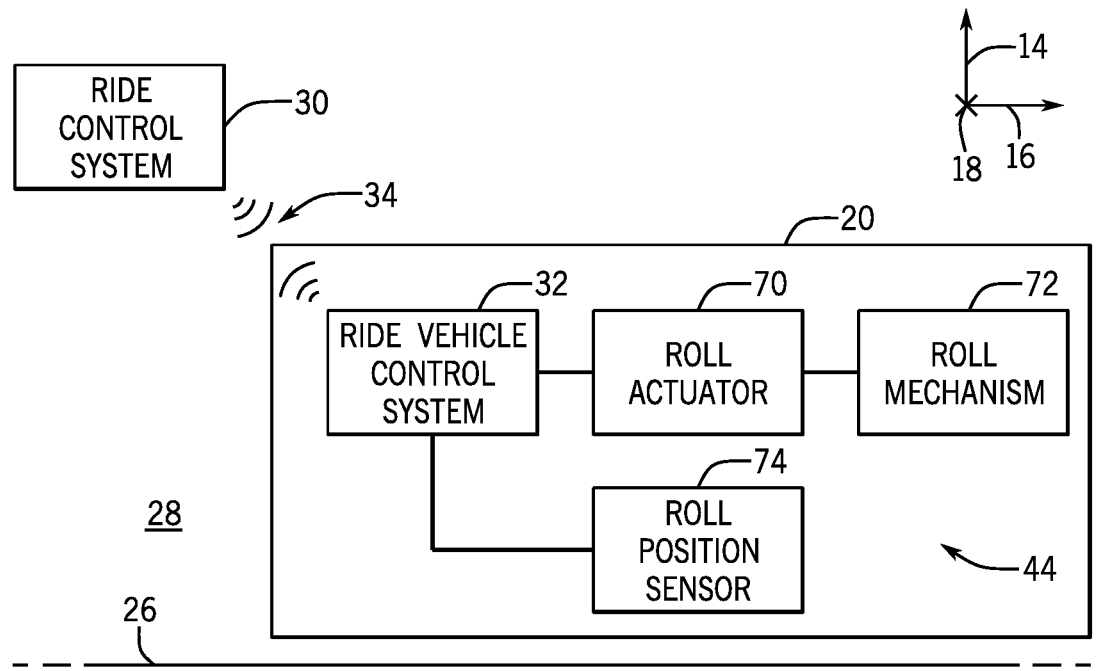
FIG. 5 is a block diagram of a side view of an embodiment of the ride system of FIG. 1 including a roll system, in accordance with an aspect of the present disclosure.

FIG. 5 is a block diagram of a side view of an embodiment of the ride system 10 of FIG. 1 including the roll system 44 of the ride vehicle 12. As described above, the roll system 44 may move the ride vehicle 12 and/or the rider support 22 angularly relative to the surface 26 of the ride area 28 of the ride system 10. As illustrated, the roll system 44 includes a roll actuator 70, a roll mechanism 72, and a roll sensor 74. The roll actuator 70 is configured to actuate to cause the roll mechanism 72 to move the ride vehicle 12 and/or the rider support 22 generally angularly relative to the surface 26 of the ride area 28. For example, the roll actuator 70 may be a piston, a hydraulic cylinder, a pneumatic cylinder, another suitable actuator, or a combination thereof, and may be coupled to the roll mechanism 72. After actuation by the roll actuator 70, the roll mechanism 72 may rotate, turn, or perform any other suitable movement to cause the ride vehicle 12 and/or the rider support 22 to move generally angularly relative to the surface 26 of the ride area 28. In certain embodiments, the ride vehicle 12 may include additional roll mechanisms 72 (e.g., two roll mechanisms 72, three roll mechanisms 72, five roll mechanisms 72, etc.). The tilting motion of the ride vehicle 12 and/or the rider support 22 may simulate the rider support 22 leaning into a turn as the ride vehicle 12 traverses the surface 26 of the ride area 28, via the ride vehicle movement system 42, or may simulate other movements associated with the movement of the ride vehicle 12.

In certain embodiments, the base 20 may be split into two components, including a first component that remains in contact with the surface 26 of the ride area 28 and a second component that moves relative to the first component and the surface 26 of the ride area 28. The second component may be coupled to the linkage assembly 24 and the rider support 22 such that tilting (e.g., rolling) the second component relative to the first component causes the rider support 22 to tilt (e.g., roll) relative to the surface 26 of the ride area 28. For example, the roll actuator 70 and/or the roll mechanism 72 may be coupled to the first component and/or the second component of the base 20, and actuation of the roll actuator 70 may cause the roll mechanism 72 to tilt the second component and the rider support 22 relative to the first component of the base 20 and the surface 26 of the ride area 28.

The roll sensor 74 may output a signal indicative of an angular position of the ride vehicle 12 and/or the rider support 22 relative to the base 20 and/or the surface 26 of the ride area 28. For example, the roll sensor 74 may sense an angular position of the ride vehicle 12 and/or the rider support 22 about the lateral axis 16 and/or the longitudinal axis 18 and may output the signal indicative of the angular position of the ride vehicle 12 and/or the rider support 22. The ride vehicle control system 32 may receive the signal indicative of the angular position of the ride vehicle 12 and/or the rider support 22 from the roll sensor 74. Based on the angular position of the ride vehicle 12 and/or the rider support 22, the ride vehicle control system 32 may adjust the angular position of the rider support 22 relative to the base 20 and/or of the ride vehicle 12 generally. For example, the ride vehicle control system 32 may output a signal to the roll actuator 70 to actuate to cause the roll mechanism 72 to move the rider support 22 generally angularly (e.g., to tilt/lean the rider support 22). In certain embodiments, the roll actuator 70 may be omitted or may be integral to the roll mechanism 72 such that the ride vehicle control system 32 may communicate directly with the roll mechanism 72 to cause the roll mechanism 72 to move the ride vehicle 12 and/or the rider support 22. Additionally, the ride control system 30 may communicate directly with the roll system 44, or portions thereof, to control the angular movement (e.g., tilting) of the ride vehicle 12 and/or the rider support 22.

Further, the roll movement caused by the roll system 44 may be combined with the movement caused by the rider support movement system 40 and/or the movement caused by the ride vehicle movement system 42. For example, while the rider support 22 is leaning to the left or right (e.g., the roll movement caused by the roll system 44), the rider support movement system 40 may move the rider support 22 generally relative to the base 20 and/or the surface 26 of the ride area 28, and/or the ride vehicle movement system 42 may turn, spin, or otherwise move the ride vehicle 12 along the surface 26 of the ride area 28 of the ride system 10. The ride control system 30 may control the roll system 44 of each ride vehicle 12 individually (e.g., independently, separately, and/or differently) to control the roll movement of each ride vehicle 12.

Figure 6:
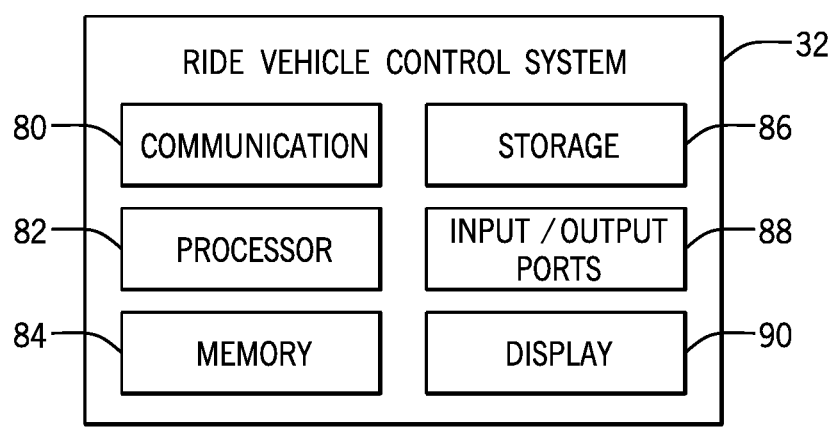
FIG. 6 is a block diagram of an embodiment of a ride vehicle control system of a ride vehicle of FIG. 1, in accordance with an aspect of the present disclosure.

FIG. 6 is a block diagram of an embodiment of example components of the ride vehicle control system 32 of the ride vehicle 12 of FIG. 1. For example, in certain embodiments, the ride vehicle control system 32 may include a communication component 80, a processor 82, a memory 84, a storage 86, input/output (I/O) ports 88, a display 90, and the like. The communication component 80 may be a wireless or wired communication component that may facilitate communication between the ride vehicle control system 32 and the ride control system 30, the rider support movement system 40, the ride vehicle movement system 42, and the roll system 44. For example, the communication component 80 may provide for the wireless connection 34 of FIGS. 2-5 and/or a wired connection.

The processor 82 may be any suitable type of computer processor or microprocessor capable of executing computer-executable code. The processor 82 may also include multiple processors that may perform the operations described below. The memory 84 and the storage 86 may be any suitable articles of manufacture that can serve as media to store processor-executable code, instructions, data, or the like. These articles of manufacture may represent computer-readable media (e.g., any suitable form of memory or storage) that may store the processor-executable code used by the processor 82 to perform the presently disclosed techniques. The memory 84 and the storage 86 may also be used to store the data and various other software applications. The memory 84 and the storage 86 may represent non-transitory computer-readable media (e.g., any suitable form of memory or storage) that may store the processor-executable code (e.g., instructions) used by the processor 82 to perform various techniques described herein. It should be noted that non-transitory merely indicates that the media is tangible and not a signal.

The I/O ports 88 may be interfaces that may couple to other peripheral components such as input devices (e.g., keyboard, mouse), sensors, and input/output (I/O) modules. The display 90 may operate to depict visualizations associated with software or executable code being processed by the processor 82. In one embodiment, the display 90 may be a touch display capable of receiving inputs from a rider of the ride vehicle 12. The display 90 may be any suitable type of display, such as a liquid crystal display (LCD), plasma display, or an organic light emitting diode (OLED) display, for example.

It should be noted that the components described above with regard to the ride vehicle control system 32 are exemplary components, and the ride vehicle control system 32 may include additional or fewer components as shown. Additionally, the ride control system 30 may include components similar to those illustrated for the ride vehicle control system 32, such as a communication component, a processor, a memory, a storage, input/output (I/O) ports, and/or a display.

Figure 7:
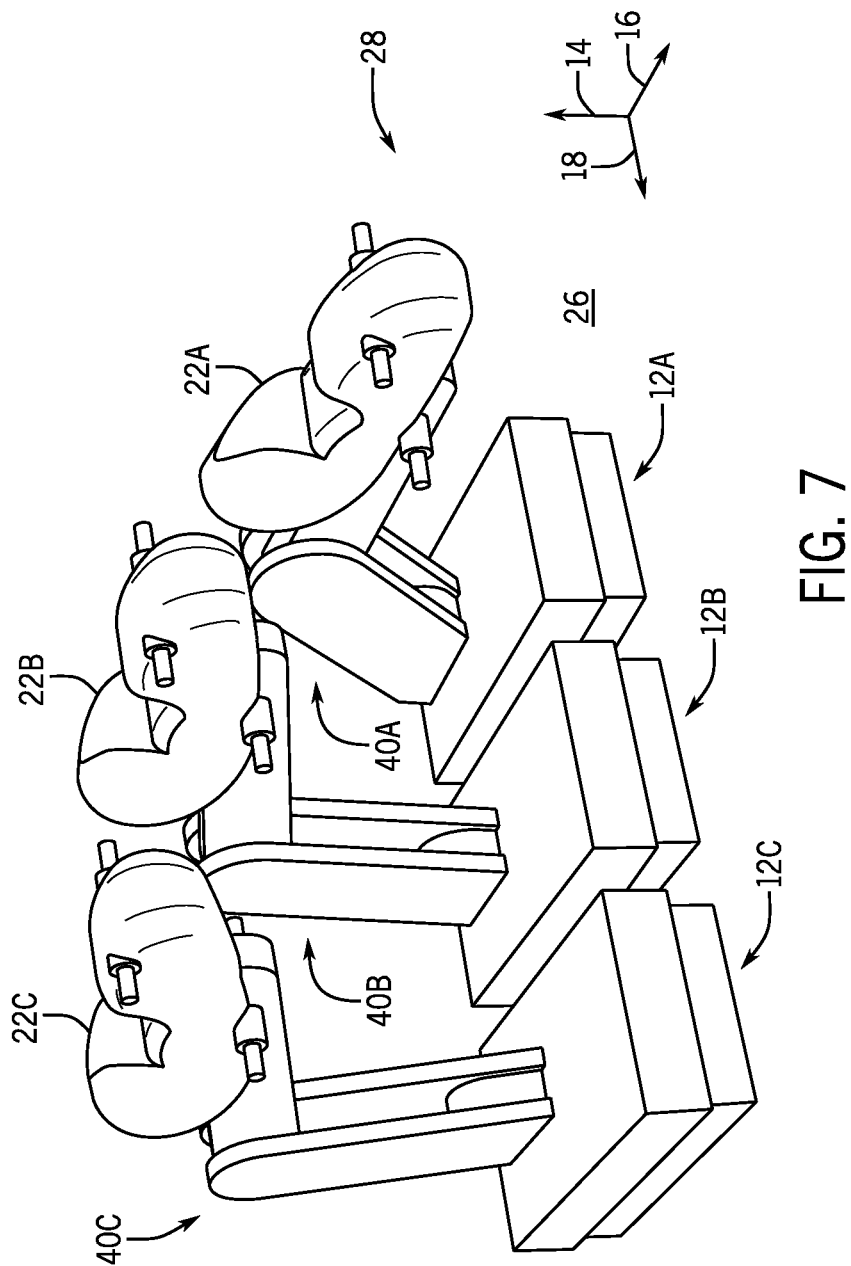
FIG. 7 is a front perspective view of an embodiment of the ride system including the ride vehicles of FIG. 1, in accordance with an aspect of the present disclosure.

FIG. 7 is a front perspective view of an embodiment of the ride system 10 including the ride vehicles 12 of FIG. 1. As illustrated, the rider support 22 of each ride vehicle 12 is positioned differently with respect to one another along the vertical axis 14 and along the longitudinal axis 16. The embodiment of FIG. 7 illustrates the relative positions of the ride vehicles 12 and the rider supports 22 of the ride vehicles 12 during a ride sequence of the ride system 10. For example, a ride vehicle 12A includes a rider support 22A positioned farther forward along the longitudinal axis 16 relative to the rider supports 22B and 22C of the ride vehicles 12B and 12C, respectively. As such, the rider support movement system 40 of the ride vehicle 12A is actuated in the illustrated embodiment to move the rider support 22A generally forward relative to the base 20.

The relative position of the rider support 22A may be based on a predetermined/choreographed routine of the ride vehicles 12 and/or based on a rider input. For example, the ride vehicle 12A may be a selected ride vehicle of the ride vehicles 12A, 12B, and 12C of the ride system 10. A rider positioned on the rider support 22A may provide an input, such as to a rider controller coupled to and/or part of the rider support 22A, indicative of an adjustment to the movement/position of the rider support 22A. The adjustment may include the rider support 22A moving generally forward relative to the choreographed routine. Additionally, as illustrated, the rider support 22B of the ride vehicle 12B is positioned slightly forward along the longitudinal axis 16 relative to the rider support 22C of the ride vehicle 12C. This positioning of the rider support 22B may be based on the rider input provided at the ride vehicle 12A and/or based on the choreographed routine. As such, the rider of the selected ride vehicle (e.g., the ride vehicle 12A) may provide an input that dynamically adjusts the movement and positioning of the group of ride vehicles 12 within the ride system 10 (e.g., a correlative adjustment). In certain embodiments, the selected ride vehicle may be a different ride vehicle 12 (e.g., the ride vehicle 12B or 12C) and the designation of the selected ride vehicle among the ride vehicles 12A, 12B, and 12C may change during the choreographed routine and during the ride sequence of the ride system 10.

Figure 8:
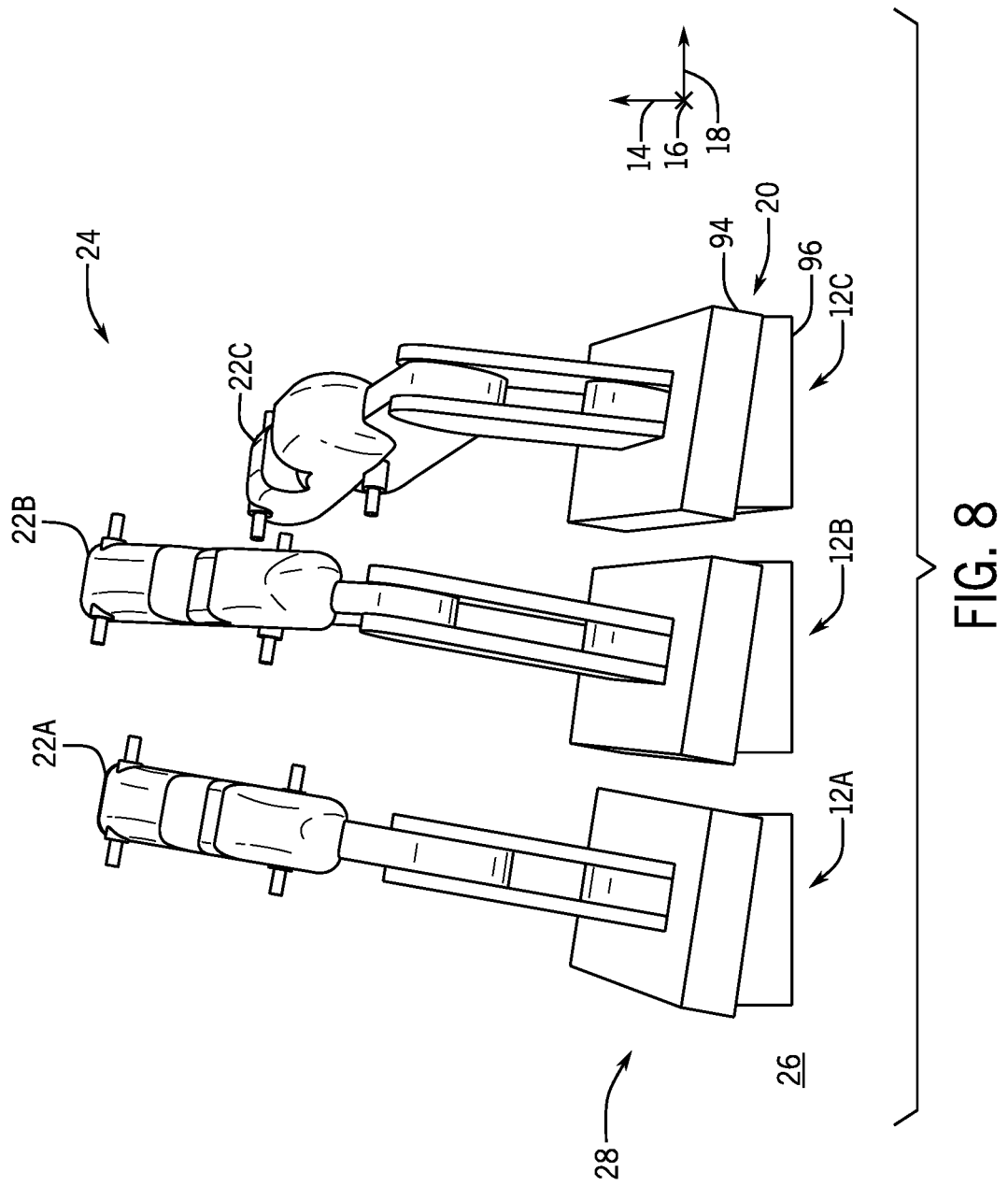
FIG. 8 is a rear view of an embodiment of the ride system including the ride vehicles of FIG. 1, in accordance with an aspect of the present disclosure.

FIG. 8 is a rear view of an embodiment of the ride system 10 including the ride vehicles 12 of FIG. 1. As illustrated, each rider support 22 of the ride vehicles 12 is positioned differently with respect to one another along the vertical axis 14, along the longitudinal axis 16, and along the lateral axis 18. The embodiment of FIG. 8 illustrates the relative positions of the ride vehicles 12 and the rider supports 22 of the ride vehicles 12 during a ride sequence of the ride system 10. For example, the ride vehicle 12A includes the rider support 22A positioned generally higher along the vertical axis 14 relative to the rider supports 22B and 22C of the ride vehicles 12B and 12C, respectively. The relative position of the rider support 22A may be based on a predetermined/choreographed routine of the ride vehicles 12 and/or based on a rider input. For example, the position of the rider support 22A may be a result of the rider of the ride vehicle 12A pulling upwardly on the rider support 22A.

As illustrated, each base 20 of the ride vehicles 12 includes an upper base component 94 and a lower base component 96 coupled to one another. Each upper base component 94 is coupled to the linkage assembly 24 and the rider support 22 of the respective ride vehicles 12. Additionally, each upper base component 94 is angularly offset relative to the respective lower base component 96 such that each base 20 provides an amount of roll/tilt for the respective ride vehicles. For example, the roll mechanism 72 of the roll system 44 of each ride vehicle 12 may include the upper base component 94 and/or the lower base component 96. The roll actuator 70 may be coupled to the upper base component 94 and/or the lower base component 96 and configured to actuate to roll/tilt the upper base component 94 and the rider support 22 relative to the lower base component 96 and the surface 26 of the ride area 28. In the illustrated embodiment, the roll actuator 70 of each ride vehicle 12 is actuated to cause the respective upper base components 94 and the rider supports 22 to tilt to the right (e.g., generally downwardly along the vertical axis 14 and to the right along the lateral axis 18).

Figure 9:
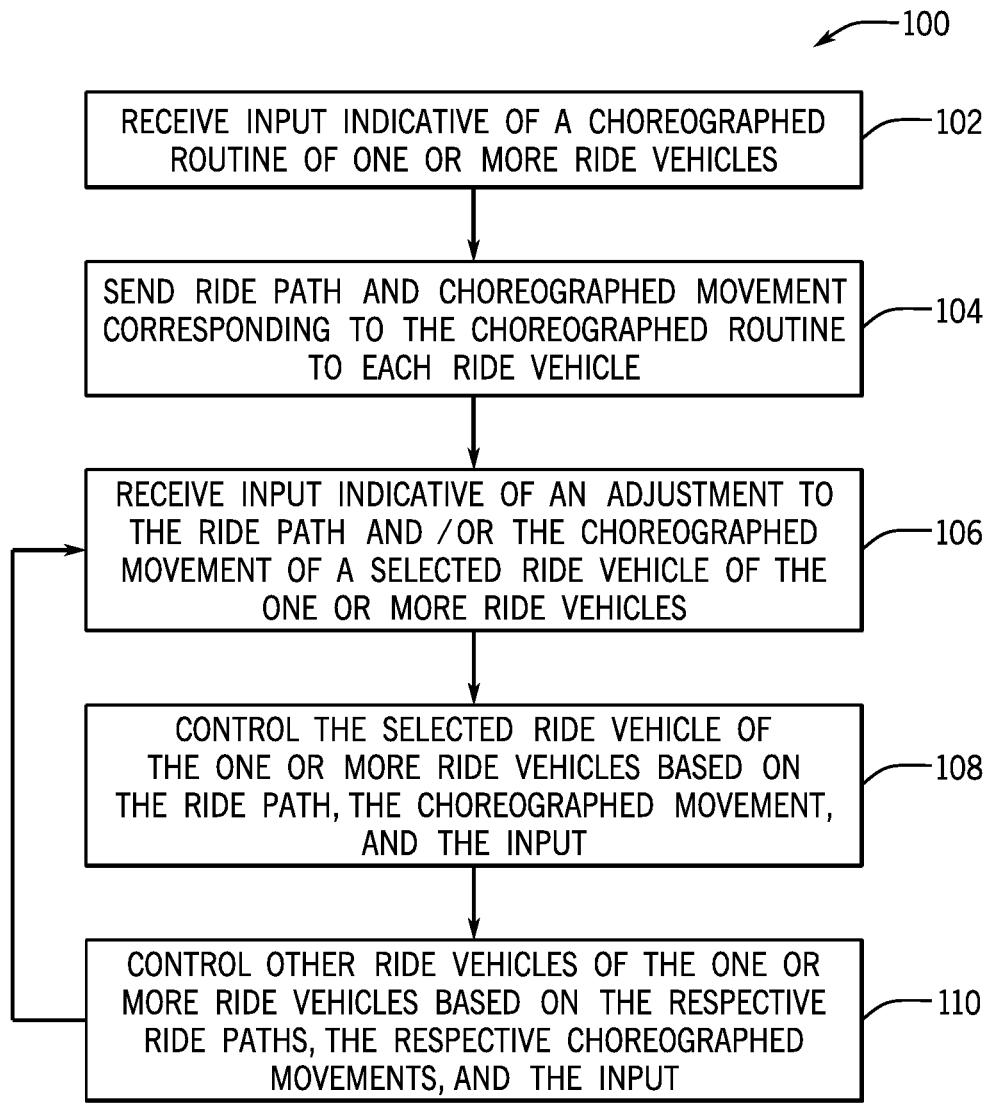
FIG. 9 is a flowchart of a method suitable for controlling the ride system of FIG. 1 based on a rider input, in accordance with an aspect of the present disclosure.

FIG. 9 is a flowchart of a method 100 suitable for controlling the ride system 10 of FIG. 1 based on a choreographed routine and/or a rider input. Although the following description of the method 100 is detailed as being performed by the ride control system 30, it should be noted that any suitable computing system may perform the method 100 described below. Moreover, it should be noted that, although the method 100 is described below in a particular order, the method 100 may be performed in any suitable order.

At block 102, the ride control system 30 receives an input indicative of a choreographed routine of one or more ride vehicles 12. For example, the choreographed routine may include a ride path for each ride vehicle 12 (e.g., choreographed movement of each ride vehicle 12 along the surface 26 of the ride area 28) and choreographed movement of each ride vehicle 12 along the respective ride path (e.g., choreographed rider support movement along the vertical axis 14 and/or along the longitudinal axis 16 and choreographed roll movement about the longitudinal axis 16). In certain embodiments, the ride system 10 may include multiple and/or different choreographed routines of the ride vehicles 12. For example, a first choreographed routine may include a first set of ride paths and choreographed movements of the ride vehicles 12 along the ride paths, and a second choreographed routine may include a second set of ride paths and choreographed movements of the ride vehicles 12 along the ride paths that is partially or wholly different from the first choreographed routine. The multiple/different choreographed routines allow the ride system 10 to provide varying experiences for the riders of the ride vehicles 12 and enhance a re-ridability appeal of the ride system 10. Additionally, some choreographed routines may not include all of the ride vehicles 12 of the ride system 10. For example, as described in greater detail below, the ride system 10 may be configured to dispatch only a subset of the ride vehicles 12 based on the choreographed routine, among other factors.

In certain embodiments, each ride path and the choreographed movements of each ride vehicle 12 may be generally similar and may generally follow a similar pattern. For example, the choreographed movements of the ride vehicles 12 may include the ride vehicles 12 maintaining a "V" formation while moving along the ride system 10. In other embodiments, the ride paths and/or the choreographed movements of some or all of the ride vehicles 12 may be different from one another.

At block 104, the ride control system 30 sends the ride path and the choreographed movement of each ride vehicle 12 that corresponds to the choreographed routine of the ride system 10 to each ride vehicle 12. The respective ride vehicle control system 32 of each ride vehicle 12 may receive the ride path and the choreographed movement and may control the ride vehicle 12 based on the ride path and the choreographed movement. For example, the ride vehicle control system 32 may control the rider support movement system 40, the ride vehicle movement system 42, and the roll system 44 to follow the respective ride path and the respective choreographed movements. In certain embodiments, the ride control system 30 may be directly communicatively coupled to and configured to control the rider support movement system 40, the ride vehicle movement system 42, and/or the roll system 44 of each ride vehicle 12 to follow the respective ride paths and the respective choreographed movements.

At block 106, the ride control system 30 receives an input indicative of an adjustment to the ride path and/or the choreographed movement of a selected ride vehicle 12. For example, the input may be received from the rider controller 54 of the selected ride vehicle 12 and/or via the ride vehicle control system 32 of the ride vehicle 12 (e.g., the ride vehicle control system 32 may receive the input from the rider controller 54 and may provide the input to the ride control system 30). As described herein, the input to the rider controller 54 may be a rider of the selected ride vehicle 12 shifting their weight while positioned on the rider support 22 of the selected ride vehicle 12 and/or an input provided by the rider to a hand controller or another control device configured to be controlled by the rider.

At block 108, the ride control system 30 may control the selected ride vehicle 12 based on the ride path, the choreographed movement, and the input indicative of the adjustment to the ride path and/or the choreographed movement of a selected ride vehicle 12. For example, the input received from the rider controller 54 may cause the ride control system 30 to dynamically adjust the rider support movement along the vertical axis 14 and/or along the longitudinal axis 16, the roll movement of the ride vehicle 12 and/or the rider support 22 about the longitudinal axis 16, and/or the movement along the surface 26 of the ride area 28 of the ride system 10. The adjustment to the movement may include an adjustment to the choreographed ride path of the selected ride vehicle 12.

At block 110, the ride control system 30 may control other ride vehicles 12 of the ride system 10 (e.g., besides the selected ride vehicle 12) based on the respective ride paths of each ride vehicle 12, respective choreographed movements of each ride vehicle 12, and the input indicative of the adjustment to the ride path and/or the choreographed movement of a selected ride vehicle 12. As described above, the respective ride path and choreographed movement of each ride vehicle 12 along the respective ride path may generally follow a similar pattern, or the ride paths and/or choreographed movements of some ride vehicles 12 may be different. As the ride vehicles 12 move along the surface 26 of the ride area 28, such as in the "V" formation described above, the ride control system 30 may receive the input from the rider controller 54 and may adjust the ride path and/or the choreographed movement of both the selected ride vehicle 12 and the other ride vehicles 12 of the ride system 10. The adjustments to the other ride vehicles 12 may be of varying degrees relative to the adjustments to the selected ride vehicle 12. For example, if the input at the rider controller 54 causes the ride control system 30 to move the selected ride vehicle 12 upwardly (e.g., to simulate the rider of the selected ride vehicle 12 pulling the selected ride vehicle 12 upwardly), the ride control system 30 may also move the other ride vehicles 12 upwardly and/or by varying amounts. The other ride vehicle 12 immediately next to the selected ride vehicle 12 may move upwardly more so relative to the other ride vehicles 12 of the ride system 10. As such, the ride system 10, via the ride control system 30, may simulate the other ride vehicles 12 moving based on the input provided at the selected ride vehicle 12 such that the rider of the selected ride vehicle 12 may appear to be a leader of the riders within the ride system 10.

Figure 10:
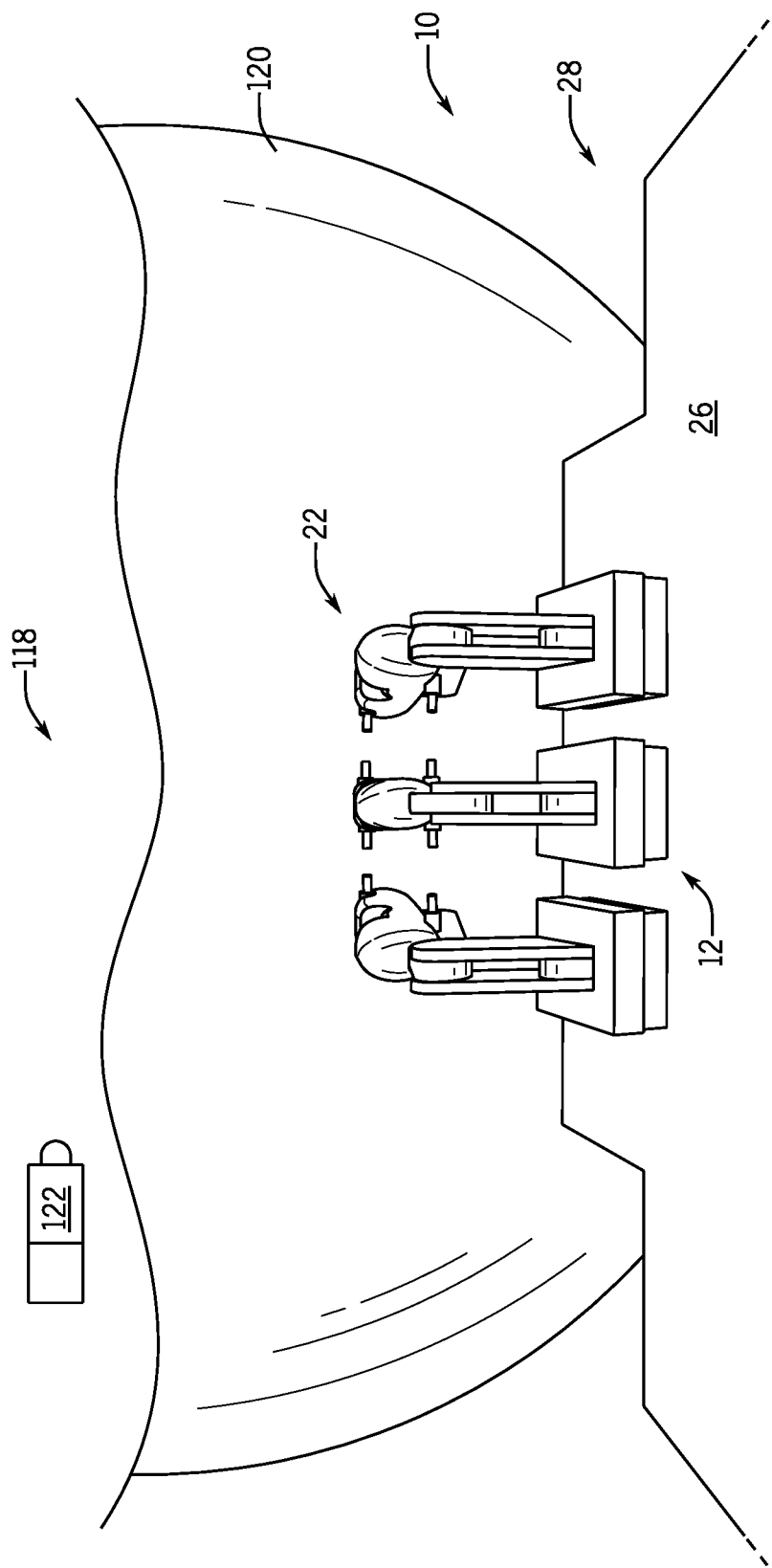
FIG. 10 is a rear view of an embodiment of the ride system including the ride vehicles of FIG. 1 and a display system positioned proximate to the ride vehicles, in accordance with an aspect of the present disclosure.

FIG. 10 is a rear view of an embodiment of the ride system 10 including the ride vehicles 12 of FIG. 1 positioned proximate to a display system 118 of the ride system 10 including a screen 120 and a projector 122. The display system 118 is configured to provide a cinematic presentation for viewing by the riders positioned on the ride vehicles 12 (e.g., positioned on the rider supports 22 of the ride vehicles 12). For example, the screen 120 of the display system 118 may be a video board configured to provide the cinematic presentation, and/or the projector 122 may be configured to project the cinematic presentation onto the screen 120 for viewing by the riders on the ride vehicles 12. In certain embodiments, the projector 122 may be omitted from the display system 118.

The ride control system 30 may control/coordinate the movements of the ride vehicles 12 and/or the rider supports 22 based on the cinematic presentation. For example, the ride control system 30 may control the rider support movement system 40, the ride vehicle movement system 42, and the roll system 44 of each ride vehicle 12 based on the cinematic presentation to simulate movement of the ride vehicles 12 within a scene of the cinematic presentation. In certain embodiments, the ride vehicles 12 may remain in generally the same positions on the surface 26 of the ride area 28 during the cinematic presentation, and the rider supports 22 may move vertically, longitudinally, and angularly relative to the surface 26 of the ride area 28 during the cinematic presentation.

In certain embodiments, the ride control system 30 may control/coordinate the movements of the ride vehicles 12 and/or the rider supports 22 based on the input provided at the selected ride vehicle 12. For example, the cinematic presentation may include multiple optional storylines that may be selected based on the input received from the rider controller 54. Each option/storyline may correspond to a specific and/or different choreographed routine or a different portion of the choreographed routine of the rider supports 22. As such, the ride system 10, via the display system 118, may provide an interactive experience for the riders of the ride vehicles 12 that allows the riders to control the storyline of the ride system 10 and the choreographed movement of the rider supports 22. In certain embodiments, the ride control system 30 may instruct the display system 118 to provide the cinematic presentation (e.g., may instruct the screen 120 to provide the cinematic presentation and/or may instruct the projector 122 to project the cinematic presentation onto the screen 120).

Figure 11:
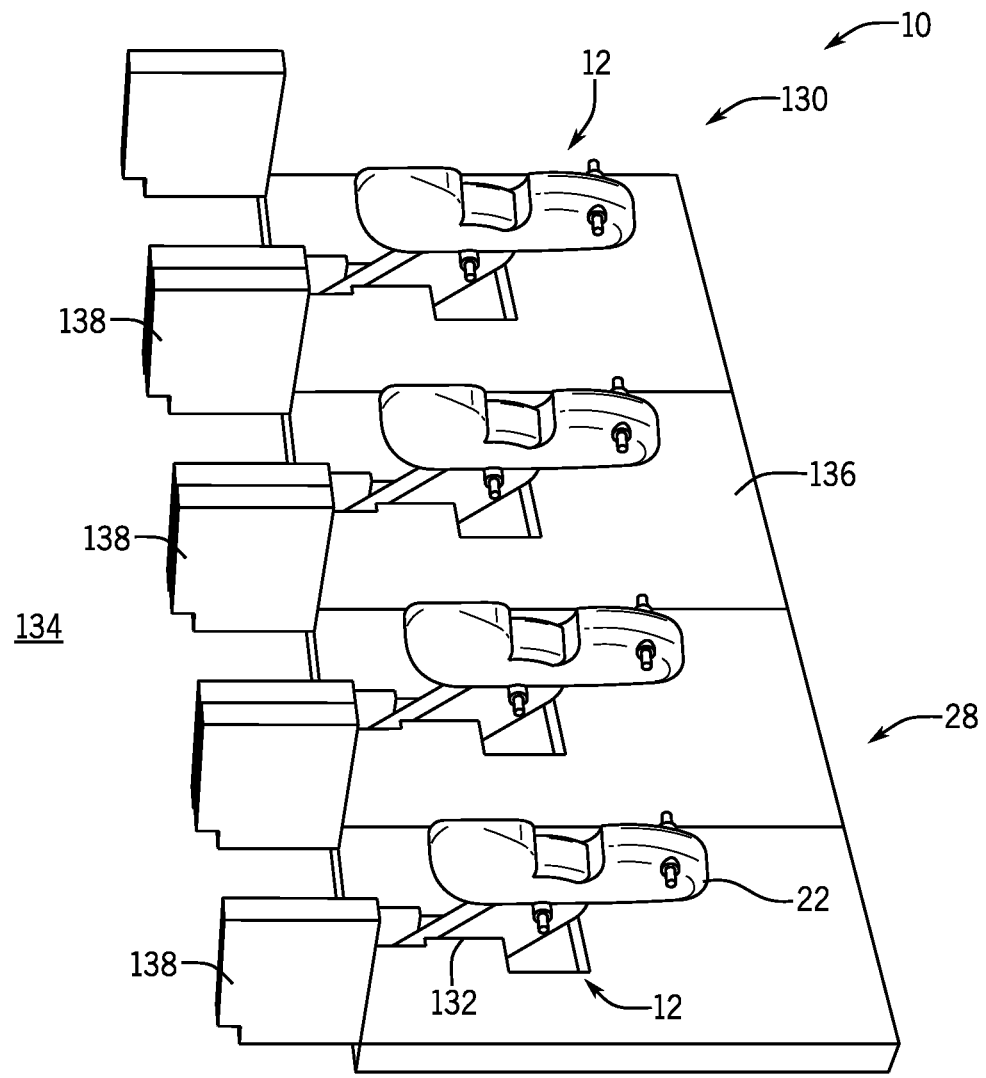
FIG. 11 is a perspective view of an embodiment of a ride system including a ride station and ride vehicles positioned within the ride station, in accordance with an aspect of the present disclosure.

FIG. 11 is a perspective view of an embodiment of the ride system 10 of FIG. 1 including a ride station 130 and the ride vehicles 12 positioned within the ride station 130. As illustrated, the ride station 130 includes a bay 132 for each ride vehicle 12. For example, each bay 132 may be configured to receive and/or accommodate a respective ride vehicle 12 while the ride vehicle 12 is not in a ride area 28 of the ride system 10. Additionally, while positioned within the bays 132, the ride vehicles 12 may be configured to receive riders. For example, the riders may travel along a platform 136 of the ride station 130 and move onto the rider supports 22 of the ride vehicles 12. The ride vehicles 12 may exit the bays 132 and move into the ride area 28 to perform the choreographed routine (e.g., to travel along respective choreographed ride paths and to perform choreographed movements while traveling along the ride paths). For example, after the riders move onto the ride vehicles 12, gates 138 coupled to the platform 136 and disposed proximate to the bays 132 may open to allow the ride vehicles 12 to exit the bays 132. As illustrated, the gates 138 are in an open position such that the ride vehicles 12 may exit the bays 132.

Figure 12:
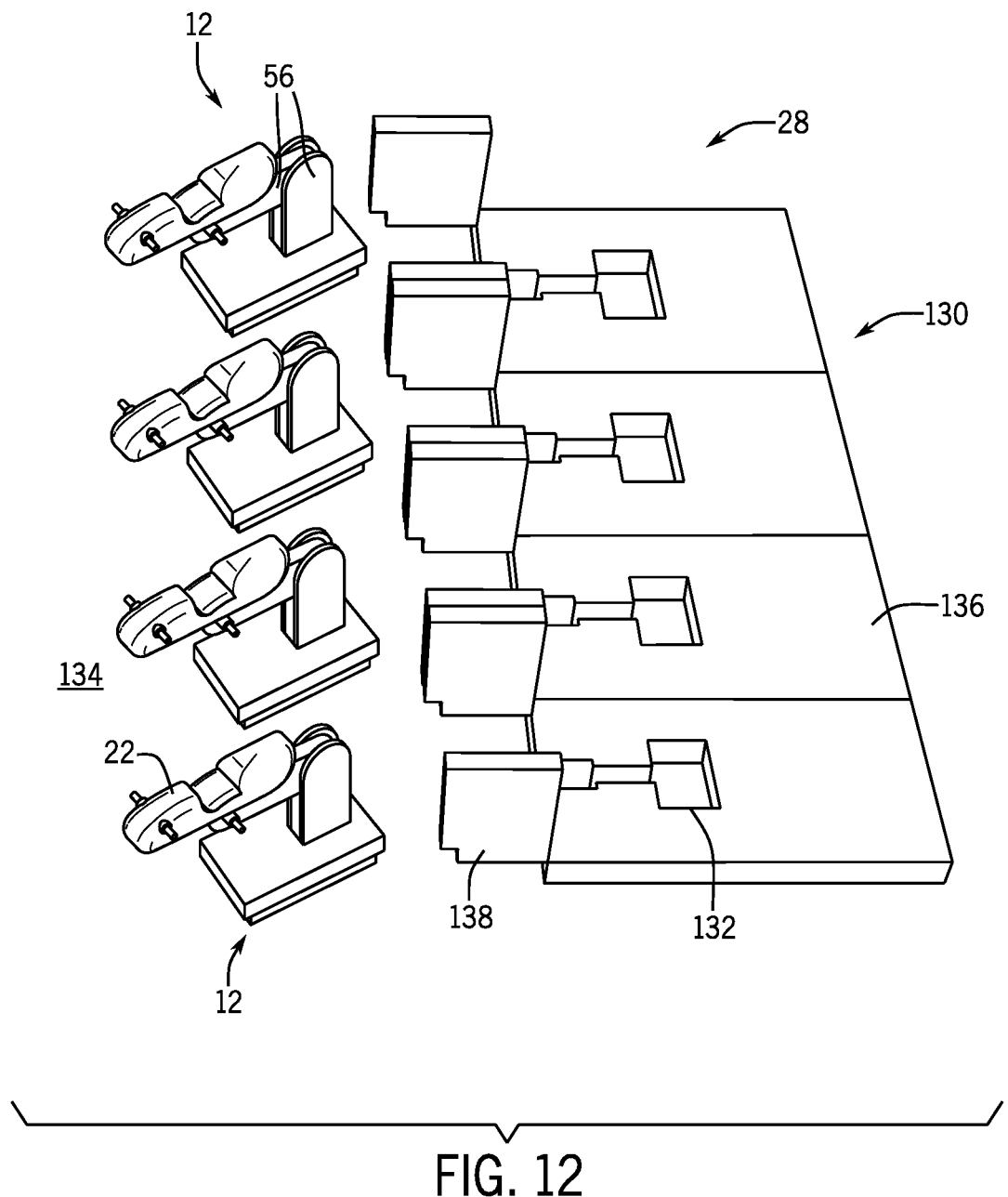
FIG. 12 is a perspective view of an embodiment of the ride system including the ride station of FIG. 11 and the ride vehicles positioned proximate to the ride station, in accordance with an aspect of the present disclosure.

FIG. 12 is a perspective view of an embodiment of the ride system 10 including the ride station 130 of FIG. 11 and the ride vehicles 12 positioned within the ride area 28 proximate to the ride station 130. As illustrated, the ride vehicles 12 have moved from the positions within the bays 132 (e.g., the positions illustrated in FIG. 11) to positions within the ride area 28. The embodiment of FIG. 12 may be a beginning portion of the choreographed routine of the ride system 10 in which the ride vehicles 12 have exited the bays 132 and turned (e.g., via the ride vehicle movement systems 42) such that the ride vehicles 12 are generally facing away from the ride station 130.

As illustrated, all four of the ride vehicles 12 have departed from the ride station 130 and moved into the ride area 28. In certain embodiments, only a subset of the ride vehicles 12 (e.g., one ride vehicle 12, two ride vehicles 12, or three ride vehicles in the illustrated embodiment) may depart from the ride station 130. The quantity of ride vehicles 12 may depend on a party size of the riders about to ride or the party size of the riders positioned on the ride vehicles 12, the choreographed routine of the ride vehicles 12 (e.g., as described above, some choreographed routines may not include all the ride vehicles 12 of the ride system 10), and other factors. In certain embodiments, the ride vehicles 12 may transition from the position within the bays 132 of FIG. 11 and/or the position in the ride area 28 of FIG. 12 to the position in front of the screen 120 of FIG. 10. As such, the ride system 10 may dispatch some or all of the ride vehicles 12 to provide a customized/personalized experience for the riders of the ride vehicles 12.

Figure 13:
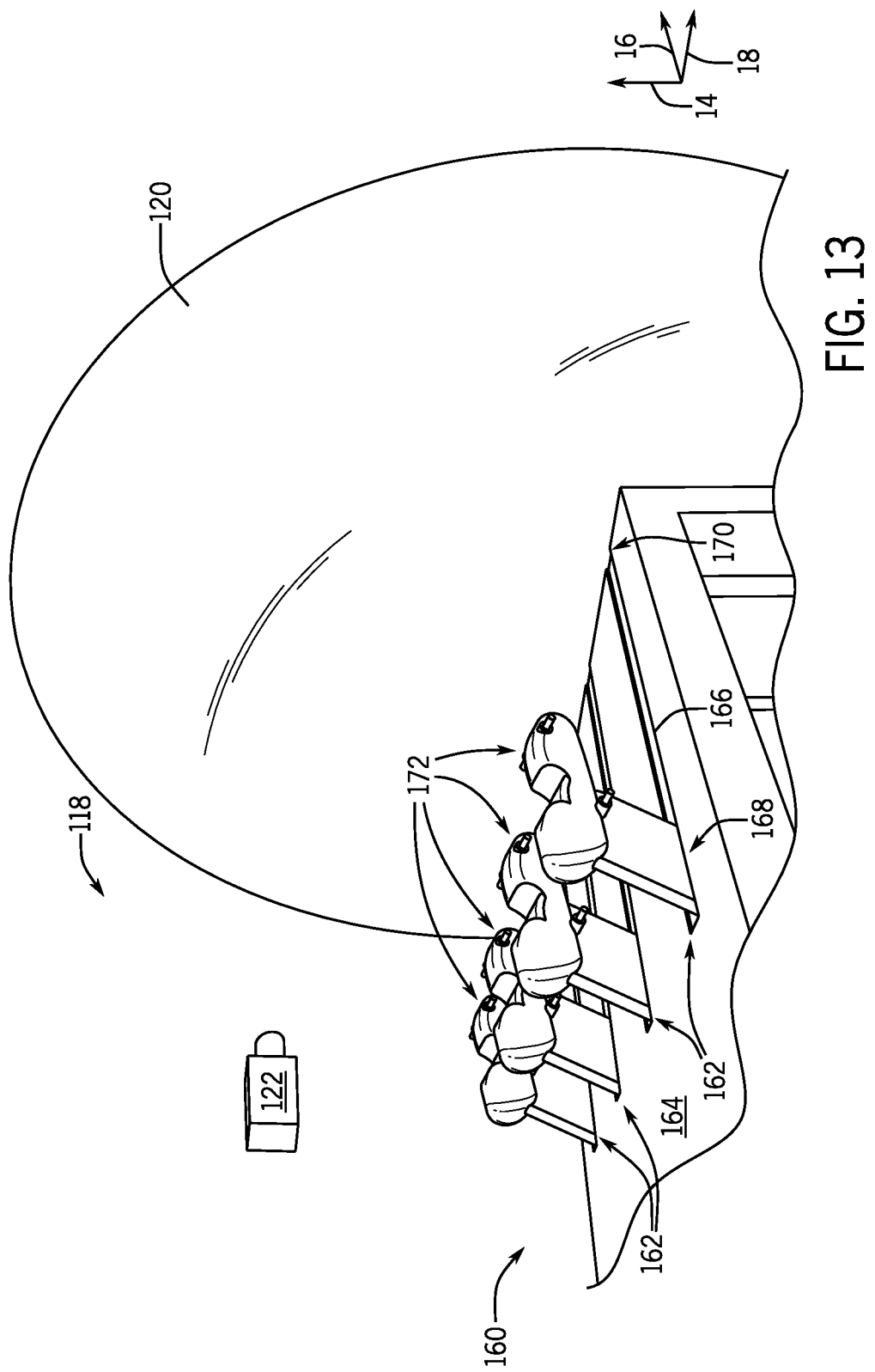
FIG. 13 is a rear perspective view of an embodiment of a ride system including ride vehicles, in accordance with an aspect of the present disclosure.

FIG. 13 is a rear perspective view of an embodiment of a ride system 160 including ride vehicles 162 and a platform 164. The ride vehicles 162 and/or the ride system 160 generally may include systems configured to move the ride vehicles 162 along the vertical axis 14, the longitudinal axis 16, and/or the lateral axis 18. For example, as described below in reference to FIG. 14, the ride vehicles 162 may be configured to move within slots 166 of the platform 164 via a ride vehicle movement system (e.g., from a rear portion 168 toward a front portion 170). Additionally, each ride vehicle 162 may include a rider support movement system configured to move a rider support 172 of the ride vehicle 162 generally along the vertical axis 14, along the longitudinal axis 16, and/or relative to the platform 164. In certain embodiments, each ride vehicle 162 may include a roll system configured to roll/tilt the rider support 172 about the longitudinal axis 16 and relative to the platform 164. Each rider support 172 is configured to carry a rider, and the ride system 160 is configured to provide an entertaining experience for each rider. For example, as the ride vehicles 162 move within the slots 166, the riders may also move while positioned on the rider supports 172. As illustrated, the ride system 160 includes four ride vehicles 162. In certain embodiments, the ride system 160 may include more or fewer ride vehicles 162 (e.g., one ride vehicle 162, two ride vehicles 162, three ride vehicles 162, five ride vehicles 162, eight ride vehicles 162, etc.).

Additionally, the ride system 160 may include the ride control system 30, and each ride vehicle 162 may include the ride vehicle control system 32 described above with respect to the ride system 10. The ride control system 30 may control the movements of the ride vehicles 162 (e.g., via communication with the ride vehicle control system 32 of each ride vehicle 162) based on a choreographed routine. For example, the ride control system 30 may control the rider support movement system, the ride vehicle movement system, and/or the roll system of each ride vehicle 162 to cause each ride vehicle 162 to move according to the choreographed routine. As described in greater detail below, the ride control system 30 may also control the ride vehicles 162 based on an input received from a selected ride vehicle 162 of the ride vehicles 162.

Figure 14:
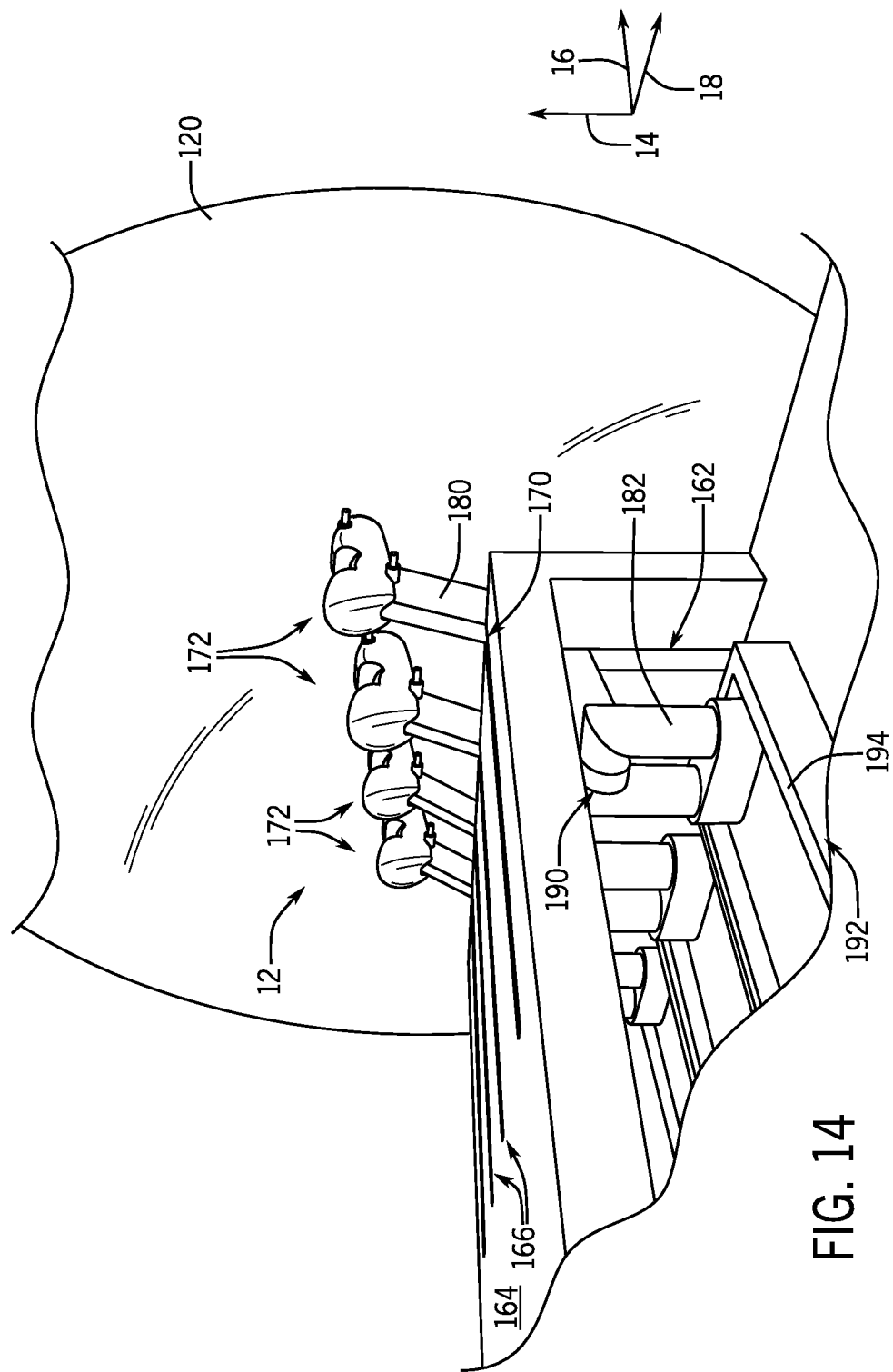
FIG. 14 is a rear perspective view of an embodiment of the ride system including the ride vehicles of FIG. 13, in accordance with an aspect of the present disclosure.

FIG. 14 is a rear perspective view of an embodiment of the ride system 160 including the ride vehicles 162 of FIG. 13. As illustrated, the ride vehicles 162 are positioned at the front portion 170 of the slots 166. Each ride vehicle 162 includes a respective rider support 172, a linkage 180 coupled to the rider support 172, and a base 182 coupled to the linkage 180. While the ride vehicles 162 are positioned at the front portions 170 of the slots 166, the rider supports 172 and a portion of each linkage 180 extend beyond the platform 164. This extension beyond the platform 164 may provide the appearance to each rider positioned on the rider supports 172 that the rider supports 172 are flying and/or may provide an entertaining experience.

As illustrated, each ride vehicle 162 includes a rider support movement system 190 and a ride vehicle movement system 192. The rider support movement system 190 of each ride vehicle 162 is configured to move the rider support 172 relative to the platform 164 and along the vertical axis 14 and along the longitudinal axis 16 (e.g., generally about the lateral axis 18). The rider support movement system 190 may include the linkage 180, the base 182, or portions thereof. For example, the rider support movement system 190 may include a support actuator coupled to the linkage 180 and/or the base 182 that is configured to actuate to move the linkage 180 relative to the base 182 and the platform 164.

The ride vehicle movement system 192 includes a track 194 positioned below the platform 164 and that extends generally along the longitudinal axis 16. The track 194 is coupled to the base 182 such that the base 182 may move within the track 194 and along the longitudinal axis 16. For example, the ride vehicle movement system 192 may include a base movement actuator configured to actuate to move the base 182 within the track 194 and relative to the platform 164. As the base 182 moves along the track 194, the linkage 180 also moves within the slot 166.

In certain embodiments, the ride system 160 and/or each ride vehicle 162 may include a roll system configured to move the rider support 172 angularly relative to the base 182 and about the longitudinal axis 16. For example, the roll system may include a roll actuator configured to actuate to move the rider support 172 relative to the base 182 and the platform 164.

Each of the rider support movement system 190, the ride vehicle movement system 192, and the roll system may be controlled by the ride control system 30 and/or the ride vehicle control system 32 of each ride vehicle 162 based on the choreographed routine. For example, the choreographed routine may include specific movements of each rider support 172 along the vertical axis 14, the longitudinal axis 16, and the lateral axis 18 that are performed by the respective rider support movement system 190, ride vehicle movement system 192, and roll system of each ride vehicle 162. The choreographed movement of each rider support 172 may be different, or the choreographed movements of some or all of the rider supports 172 may generally be the same. In the illustrated embodiment, each rider support 172 is positioned differently along the vertical axis 14. For example, the embodiment of FIG. 14 illustrates the ride vehicles 162 during a ride sequence of the ride system 160 that includes each rider support at varying positions along the vertical axis 14. In certain embodiments, as described in greater detail below, the ride control system 30 may control the ride vehicles 162 based on an input provided to a rider controller of a selected ride vehicle 162 in addition to or in place of the choreographed movements of the choreographed routine.

The ride system 160 includes the display system 118. The display system 118 is configured to provide a cinematic presentation for viewing by the riders positioned on the ride vehicles 162 (e.g., positioned on the rider supports 172 of the ride vehicles 162). The ride control system 30 may control/coordinate the movements of the ride vehicles 162 and/or the rider supports 172 based on the cinematic presentation. For example, the ride control system 30 may control the rider support movement system 190, the ride vehicle movement system 192, and the roll system of each ride vehicle 162 based on the cinematic presentation to simulate movement of the ride vehicles 162 within a scene of the cinematic presentation. In certain embodiments, the ride control system 30 may instruct the display system 118 to provide the cinematic presentation.

Figure 15:
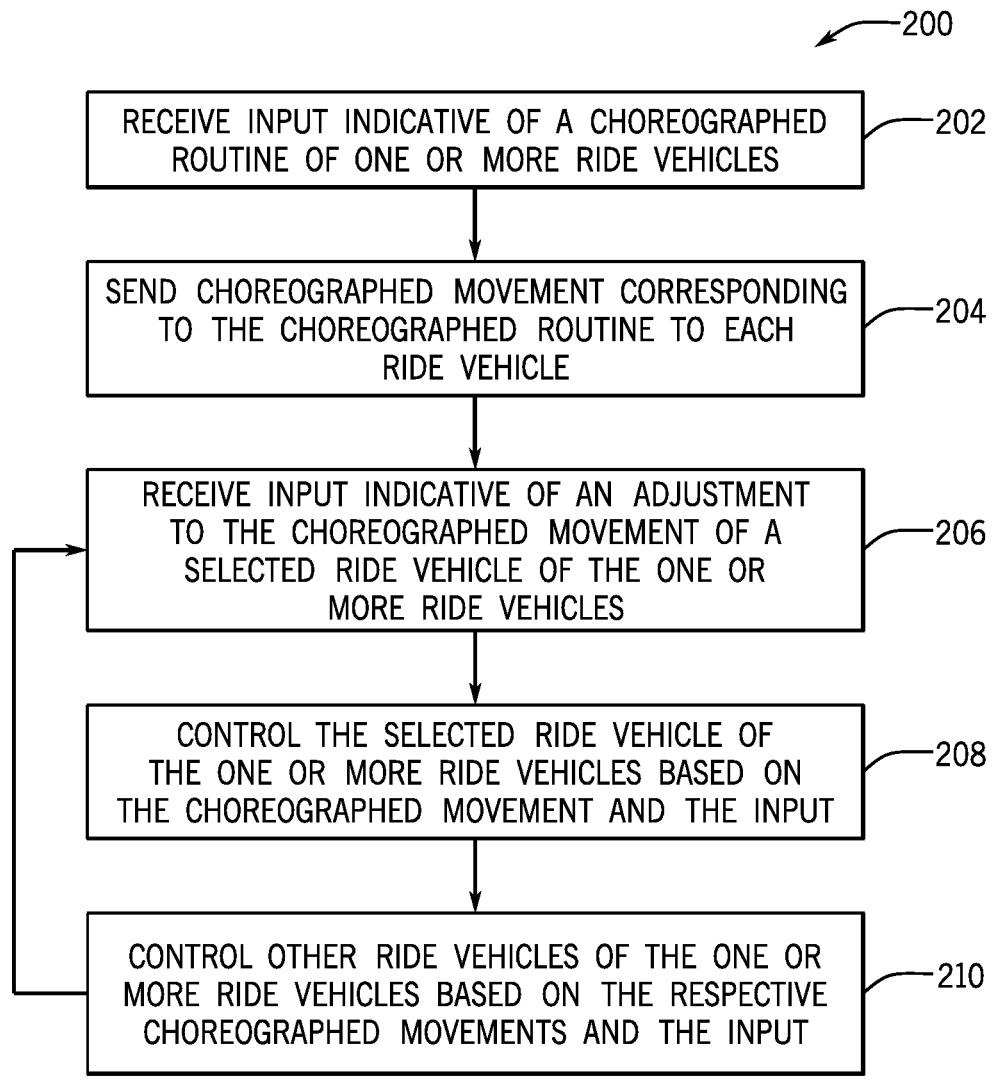
FIG. 15 is a flowchart of a method suitable for controlling the ride system of FIG. 13, in accordance with an aspect of the present disclosure.

FIG. 15 is a flowchart of a method 200 suitable for controlling the ride system 160 of FIG. 13 based on a choreographed routine and/or a rider input. Although the following description of the method 200 is detailed as being performed by the ride control system 30, it should be noted that any suitable computing system may perform the method 200 described below. Moreover, it should be noted that although the method 200 is described below in a particular order, the method 200 may be performed in any suitable order.

At block 202, the ride control system 30 receives an input indicative of a choreographed routine of one or more ride vehicles 162. For example, the choreographed routine may include choreographed rider support movement of each rider support 172 along the vertical axis 14 and/or along the longitudinal axis 16 and choreographed roll movement about the longitudinal axis 16. In certain embodiments, the ride system 160 may include multiple and/or different choreographed routines of the ride vehicles 162. For example, a first choreographed routine may include a first set of choreographed movements of the ride vehicles 162, and a second choreographed routine may include a second set of choreographed movements of the ride vehicles 162 that is partially or wholly different from the first choreographed routine. The multiple/different choreographed routines allow the ride system 160 to provide varying experiences for the riders of the ride vehicles 162 and enhance a re-ridability appeal of the ride system 160. Additionally, some choreographed routines may not include all of the ride vehicles 162 of the ride system 160. For example, the ride system 160 may be configured to dispatch only a subset of the ride vehicles 162 based on the choreographed routine, among other factors (e.g., such as party size).

At block 204, the ride control system 30 sends the choreographed movement of each ride vehicle 162 that corresponds to the choreographed routine of the ride system 160 to each ride vehicle 162. The respective ride vehicle control system 32 of each ride vehicle 162 may receive the choreographed movement and may control the ride vehicle 162 based on the choreographed movement. For example, the ride vehicle control system 32 may control the rider support movement system 190, the ride vehicle movement system 192, and the roll system to follow the respective choreographed movements. In certain embodiments, the ride control system 30 may be directly communicatively coupled to and configured to control the rider support movement system 190, the ride vehicle movement system 192, and/or the roll system of each ride vehicle 162 to follow the respective choreographed movements.

At block 206, the ride control system 30 receives an input indicative of an adjustment to the ride path and/or the choreographed movement of a selected ride vehicle 162. For example, some or all of the ride vehicles 162 may include the rider controller 54, and one ride vehicle 162 may be designated as the selected ride vehicle 162 in a given time period during a ride sequence of the ride system 160. An input may be received from the rider controller 54 of the selected ride vehicle 162 and/or via the ride vehicle control system 32 of the ride vehicle 162 (e.g., the ride vehicle control system 32 may receive the input from the rider controller 54 and may provide the input to the ride control system 30). As described herein, the input to the rider controller 54 may be a rider of the selected ride vehicle 162 shifting their weight while positioned on the rider support 172 of the selected ride vehicle 162, and/or an input provided by the rider to a hand controller or another control device.

At block 208, the ride control system 30 may control the selected ride vehicle 162 based on the choreographed movement and the input indicative of the adjustment to the choreographed movement of a selected ride vehicle 162. For example, the input received from the rider controller 54 may cause the ride control system 30 to dynamically adjust the rider support movement along the vertical axis 14 and/or along the longitudinal axis 16, the roll movement of the ride vehicle 162 and/or the rider support 172 about the longitudinal axis 16, and/or the movement along the track 194 of the ride system 160.

At block 210, the ride control system 30 may control other ride vehicles 162 of the ride system 160 (e.g., besides the selected ride vehicle 162) based on the respective choreographed movements of each ride vehicle 162 and the input indicative of the adjustment to the choreographed movement of the selected ride vehicle 162. As described above, the respective choreographed movement of each ride vehicle 162 may generally follow a similar pattern, or the choreographed movements of some ride vehicles 162 may be different. As the ride vehicles 162 move within the tracks 194, such as in a "V" formation, the ride control system 30 may receive the input from the rider controller 54 and may adjust the choreographed movement of both the selected ride vehicle 162 and the other ride vehicles 162 of the ride system 160. The adjustments to the other ride vehicles 162 may be of varying degrees relative to the adjustments to the selected ride vehicle 162. For example, if the input at the rider controller 54 causes the ride control system 30 to move the selected ride vehicle 162 upwardly (e.g., to simulate the rider of the selected ride vehicle 162 pulling the selected ride vehicle 162 upwardly), the ride control system 30 may also move the other ride vehicles 162 upwardly and/or by varying amounts. The other ride vehicle 162 immediately next to the selected ride vehicle 162 may move upwardly more so relative to the other ride vehicles 162 of the ride system 160. As such, the ride system 160, via the ride control system 30, may simulate the other ride vehicles 162 moving based on the input provided at the selected ride vehicle 162 such that the rider of the selected ride vehicle 162 may appear to be a leader of the riders within the ride system 160.

Figure 16:
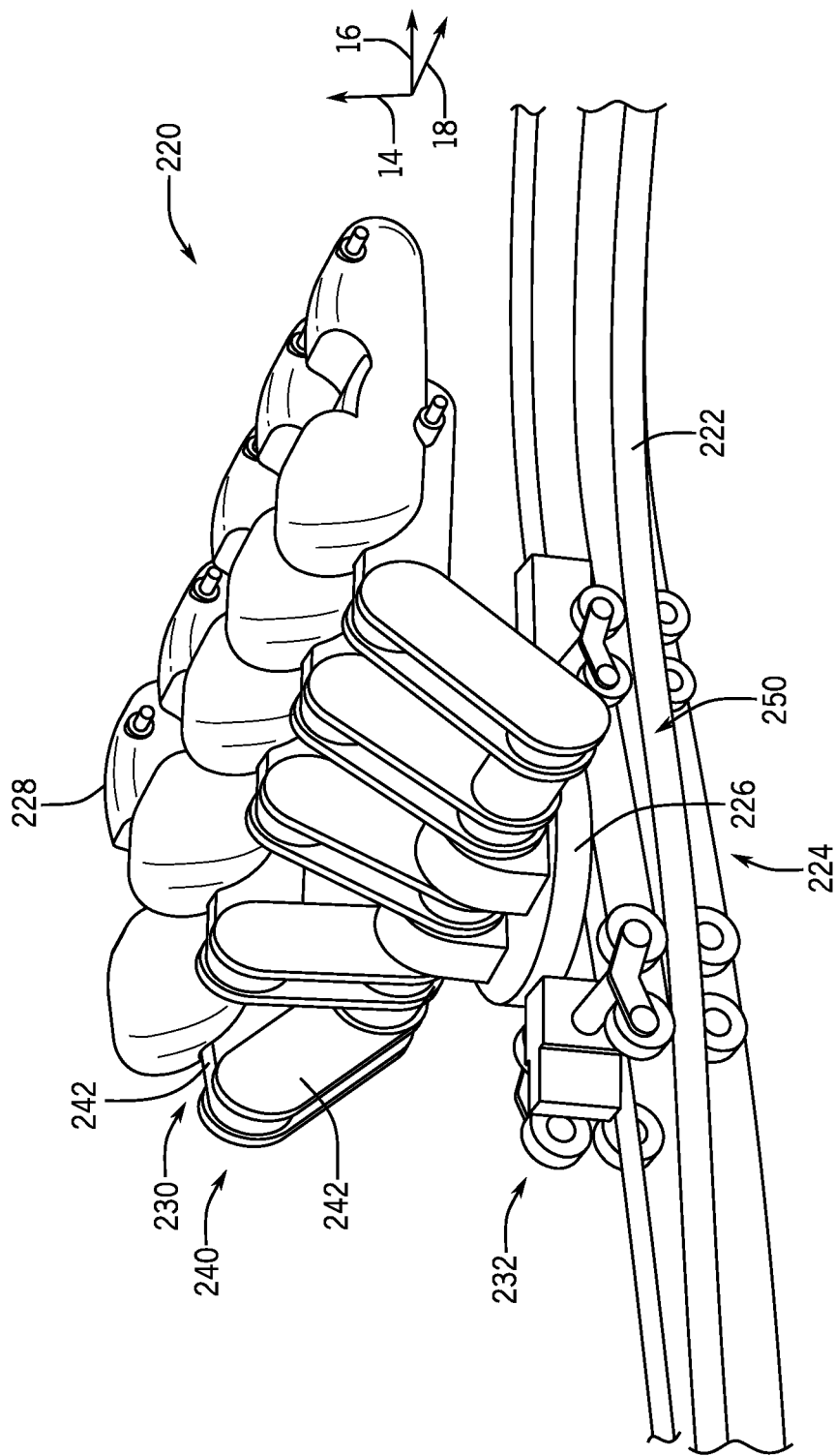
FIG. 16 is a perspective view of an embodiment of a ride system including a ride track and a ride vehicle positioned on the ride track, in accordance with an aspect of the present disclosure.

FIG. 16 is a perspective view of an embodiment of a ride system 220 including a ride track 222 and a ride vehicle 224 positioned on the ride track 222. As illustrated, the ride vehicle 224 includes a base 226 coupled to the ride track 222 and rider supports 228 coupled to the base 226 via respective linkage assemblies 230. The ride vehicle 224 include systems configured to move the ride vehicle 224 along the ride track 222 and move the rider supports 228 relative to the base 226 for the entertainment of riders riding the rider supports 228 of the ride vehicle 224. For example, the ride vehicle 224 includes a ride vehicle movement system 232 configured to move the base 226 along the ride track 222. The ride vehicle movement system 232 may include a base movement actuator, wheels, gears, and other suitable mechanisms configured to move the base 226 along the ride track 222. The movement and/or speed of the ride vehicle 224 along the ride track 222 (e.g., via the base 226) may be based on a choreographed routine of the ride system 220.

The ride vehicle 224 also includes rider support movement systems 240 configured to move each rider support 228 relative to one another, the ride track 222, and/or the base 226. Each rider support movement system 240 may include a respective rider support 228, a respective linkage assembly 230, and/or a support actuator. The support actuator may be configured to actuate to cause the linkage assembly 230 to move the rider support 228 relative to the base 226 and/or the ride track 222. After actuation by the support actuator, linkages 242 of the linkage assembly 230 may rotate relative to one another (e.g., via a pivot point at which the linkages 242 are coupled) to cause the rider support 228 to move relative to the base 226 and/or the ride track 222. For example, a first linkage 242 may be coupled to the support actuator and to a second linkage 242. The support actuator may move the first linkage 242, which may cause movement of the second linkage 242 and the rider support 228. In certain embodiments, the linkage assembly 230 may include additional mechanisms to enable/cause the movement of the rider support 228 generally along the vertical axis 14 and/or along the longitudinal axis 16, such as a pin connecting the linkages 242, an additional actuator coupled to and/or configured to move both the linkages 242, and other suitable mechanisms.

The ride vehicle 224 includes a roll system 250 configured to move the ride vehicle 224 angularly relative to the ride track 222 (e.g., to rotate the ride vehicle 224 about the longitudinal axis 16 and the ride track 222). The roll system 250 may include the base 226 and a roll actuator configured to move the base 226 angularly relative to the ride track 222.

For example, the roll actuator may be configured to actuate to cause the base 226 to move angularly relative to the ride track 222. In certain embodiments, the ride vehicle 224 may include multiple roll systems 250 with each roll system 250 configured to move a respective rider support 228 angularly relative to the base 226 (e.g., to rotate about the longitudinal axis 16 and the base 226).

Additionally, the ride system 220 may include the ride control system 30, and/or each rider support 228 may include the ride vehicle control system 32 described above with respect to the ride system 10. The ride control system 30 may control the movements of the ride vehicle 224 (e.g., via communication with the ride vehicle control systems 32 of each rider support 228) based on a choreographed routine. For example, the ride control system 30 may control the rider support movement system 240 and the roll system of the ride vehicle 224 of each rider support 228 to cause the ride vehicle 224 and each rider support 228 to move according to the choreographed routine. As described in greater detail below, the ride control system 30 may also control the ride vehicle 224 and the rider supports 228 based on an input received from a selected rider support 228 of the rider supports 228. In certain embodiments, the ride vehicle 224 may include an independent controller, such as a controller similar to the ride vehicle control system 32, configured to control the ride vehicle 224.

Figure 17:
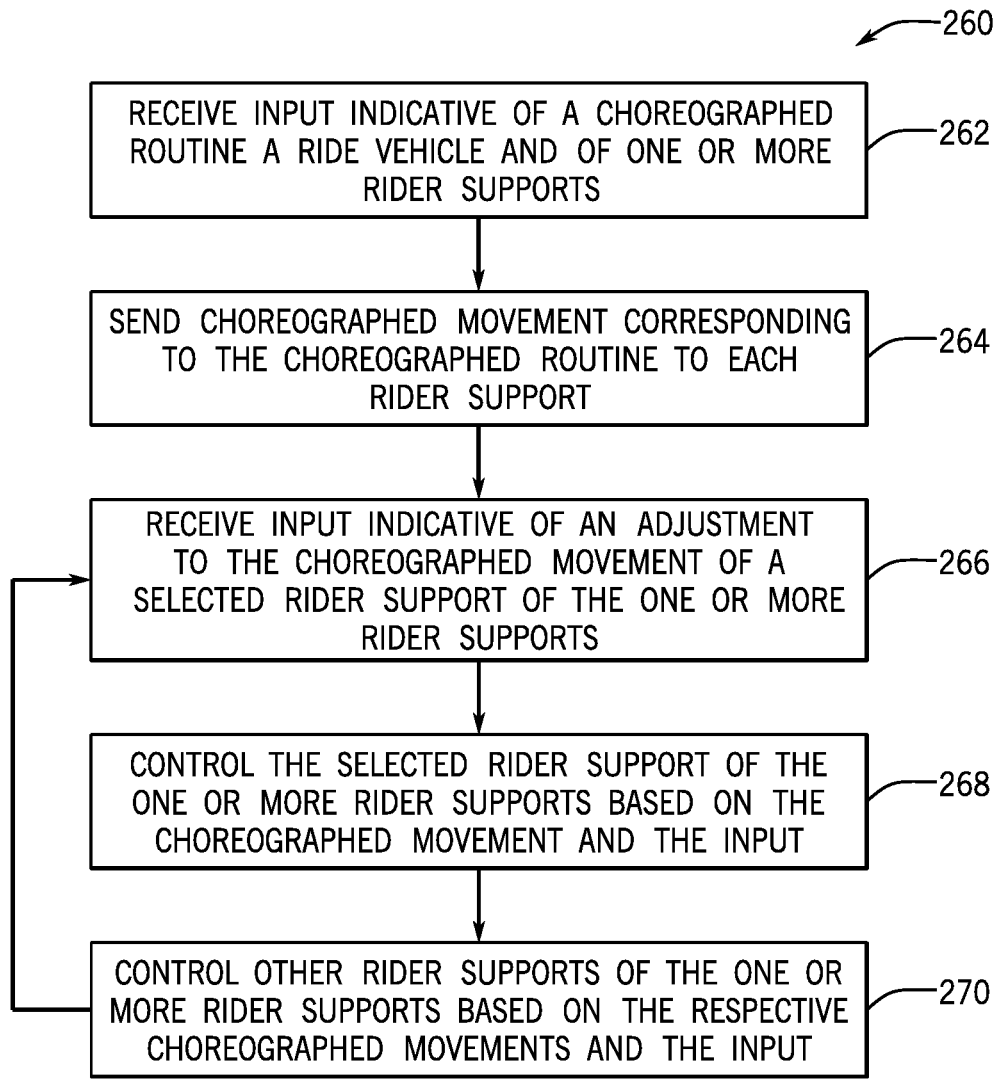
FIG. 17 is a flowchart of a method suitable for controlling the ride system of FIG. 16, in accordance with an aspect of the present disclosure.

FIG. 17 is a flowchart of a method 260 suitable for controlling the ride system 220 of FIG. 16 based on a choreographed routine and/or a rider input. Although the following description of the method 260 is detailed as being performed by the ride control system 30, it should be noted that any suitable computing system may perform the method 260 described below. Moreover, it should be noted that although the method 260 is described below in a particular order, the method 260 may be performed in any suitable order.

At block 262, the ride control system 30 receives an input indicative of a choreographed routine of the ride vehicle 224 and the rider supports 228. For example, the choreographed routine may include choreographed ride vehicle movement of the ride vehicle 224 along the ride track 222, choreographed roll movement of the ride vehicle 224 about the longitudinal axis 16, and choreographed rider support movement of each rider support 228 along the vertical axis 14 and/or along the longitudinal axis 16. In certain embodiments, the ride system 220 may include multiple and/or different choreographed routines of the rider supports 228. For example, a first choreographed routine may include a first set of choreographed movements of the rider supports 228, and a second choreographed routine may include a second set of choreographed movements of the rider supports 228 that is partially or wholly different from the first choreographed routine. The multiple/different choreographed routines allow the ride system 220 to provide varying experiences for the riders of the rider supports 228 and may enhance a re-ridability appeal of the ride system 220.

At block 264, the ride control system 30 sends the choreographed movement of each rider support 228 that corresponds to the choreographed routine of the ride system 220 to each rider support 228. The respective ride vehicle control system 32 of each rider support 228 may receive the choreographed movement and may control the rider support 228 based on the choreographed movement. For example, the ride vehicle control system 32 of each rider support 228 may control the respective rider support movement system 240. In certain embodiments, the ride control system 30 may be directly communicatively coupled to and configured to control the rider support movement system 240 to follow the respective choreographed movements. Additionally, the ride control system 30 may control the ride vehicle movement system 232 and/or the roll system 250 of the ride vehicle 224 based on the choreographed routine.

At block 266, the ride control system 30 receives an input indicative of an adjustment to the choreographed movement of a selected rider support 228. For example, some or all of the rider supports 228 may include the rider controller 54, and one rider support 228 may be designated as the selected rider support 228 in a given time period during a ride sequence of the ride system 220. An input may be received from the rider controller 54 of the selected rider support 228 and/or via the ride vehicle control system 32 of the selected rider support 228 (e.g., the ride vehicle control system 32 may receive the input from the rider controller 54 and may provide the input to the ride control system 30). As described herein, the input to the rider controller 54 may be a rider of the selected rider support 228 shifting their weight while positioned on the selected rider support 228 and/or an input provided by the rider to a hand controller or another control device configured to be controlled by the rider.

At block 268, the ride control system 30 may control the selected rider support 228 based on the choreographed movement and the input indicative of the adjustment to the choreographed movement of a selected rider support 228. For example, the input received from the rider controller 54 may cause the ride control system 30 to dynamically adjust the rider support movement along the vertical axis 14 and/or along the longitudinal axis 16. In certain embodiments, the ride control system 30 may control the ride vehicle movement and/or the roll movement of the ride vehicle 224 (e.g., via the ride vehicle movement system 232 and/or the roll system 250) based on the choreographed routine and the input indicative of the adjustment to the choreographed movement. For example, the input provided by the rider of the selected rider support 228 may cause the ride control system 30 to adjust the ride vehicle movement and/or the roll movement of the ride vehicle 224.

At block 270, the ride control system 30 may control other rider supports 228 of the ride system 220 (e.g., besides the selected rider support 228) based on the respective choreographed movements of each rider support 228 and the input indicative of the adjustment to the choreographed movement of the selected rider support 228. As described above, the respective choreographed movement of each rider support 228 may generally follow a similar pattern, or the choreographed movements of some rider supports 228 may be different. As the rider supports 228 move along the ride track 222 (e.g., via the base 226), such as in a "V" formation, the ride control system 30 may receive the input from the rider controller 54 and may adjust the choreographed movement of both the selected rider support 228 and the other rider supports 228 of the ride vehicle 224. The adjustments to the other rider supports 228 may be of varying degrees relative to the adjustments to the selected rider support 228. For example, if the input at the rider controller 54 causes the ride control system 30 to move the selected rider support 228 upwardly (e.g., to simulate the rider of the selected rider support 228 pulling the selected rider support 228 upwardly), the ride control system 30 may also move the other rider supports 228 upwardly and/or by varying amounts. The other rider support 228 immediately next to the selected rider support 228 may move upwardly more so relative to the other rider supports 228 of the ride vehicle 224. As such, the ride system 220, via the ride control system 30, may simulate the other rider supports 228 moving based on the input provided at the selected rider support 228 such that the rider of the selected rider support 228 may appear to be a leader of the riders within the ride system 220.

As set forth above, embodiments of the ride systems of the present disclosure may provide one or more technical effects useful in enhancing riders' experiences while riding ride vehicles and rider supports of the ride vehicles within the ride systems. For example, some ride systems may include multiple ride vehicles that may carry riders within the ride area to entertain and/or transport the riders. Movement of the ride vehicles may be choreographed along ride paths and/or with respect to one another and other portions of the ride system. Additionally, the ride vehicles may move in certain directions relative to a surface of a ride area of the ride system, and/or may include rider supports that may carry the riders and move relative to the surface of the ride area of the ride system and/or other portions of the ride vehicles. For example, the ride vehicles may include mechanisms and portions (e.g., the rider supports) that may move vertically with respect to a surface of the ride area and a base of the ride vehicle, horizontally in various directions (e.g., may move in any planar direction, may spin, and may turn), and that may roll (e.g., lean and/or move angularly with respect to the surface of the ride area). In certain embodiments, the ride systems and/or the ride vehicles may include a control system that controls movement of the ride vehicles within the ride area. For example, based on a position of a ride vehicle with respect to a ride path (e.g., based on an actual position of the ride vehicle relative to an intended position of the ride vehicle along the ride path), the control system may adjust a trajectory or traveled course of the ride vehicle.

In certain embodiments, the ride vehicles of the ride system may include a selected ride vehicle configured to lead the ride vehicles. A rider riding the selected vehicle may provide an input, such as by shifting their weight, controlling a joystick or other hand controller, pressing a button, or a combination thereof. Based on the rider input, a controller of the selected ride vehicle and/or of the ride system may adjust the trajectory of the selected ride vehicle and/or movement of the rider support of the selected ride vehicle. For example, if the rider of the selected ride vehicle provides an input indicative of pulling the rider support of the selected ride vehicle upwardly and leaning the rider support toward the left, the controller may adjust the movement of the selected ride vehicle from the planned and choreographed ride path to generally move the rider support upwardly and to the left. Additionally, the ride system controller may adjust the movement of some or all of the other ride vehicles and/or the rider supports of the other ride vehicles within the ride system. The adjustments to the movements of the other ride vehicles may generally correspond to the movement of the selected ride vehicle, may mirror the movement of the selected ride vehicle, and/or may be of a varying/different degree relative to the movement of the selected ride vehicle. As such, the embodiments of the ride systems described herein may allow riders to at least partially control the ride vehicles and may allow the ride systems to dynamically adjust the movement of the ride vehicles based on the input provided by the riders. Thus, the ride systems may provide an entertaining and interactive experience for the riders.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A ride system, comprising:
a plurality of ride vehicles, wherein each ride vehicle of the plurality of ride vehicles comprises:
a rider support configured to carry a rider;
a support actuator coupled to the rider support and a base of the ride vehicle, wherein the support actuator is configured to move the rider support relative to the base; and
a ride vehicle movement system integrated with the base and configured to move the ride vehicle relative to a ride area; and
a controller configured to control the support actuator of each ride vehicle of the plurality of ride vehicles individually and the ride vehicle movement system of each ride vehicle of the plurality of ride vehicles individually based at least in part on:
instructions, stored in memory, for performing a choreographed routine for the plurality of ride vehicles; and
an input received from a selected ride vehicle of the plurality of ride vehicles, wherein the input is indicative of an adjustment to the support actuator of each ride vehicle of the plurality of ride vehicles, the ride vehicle movement system of each ride vehicle of the plurality of ride vehicles, or both, and wherein the input is based on a correlative adjustment to the support actuator of the selected ride vehicle, the ride vehicle movement system of the selected ride vehicle, or both.

2. The ride system of claim 1, wherein the choreographed routine comprises choreographed riding support movement instructions for each rider support and each ride vehicle movement system of each ride vehicle of the plurality of ride vehicles.

3. The ride system of claim 1, wherein the choreographed routine comprises a designation of the selected ride vehicle of the plurality of ride vehicles based at least in part on a time sequence of the choreographed routine, and wherein the selected ride vehicle is a first ride vehicle of the plurality of ride vehicles in a first time period during the time sequence, and the selected ride vehicle is a second ride vehicle of the plurality of ride vehicles in a second time period during the time sequence.

4. The ride system of claim 1, comprising a plurality of linkages coupled to one another, wherein a first linkage of the plurality of linkages is coupled to the support actuator and a second linkage of the plurality of linkages is coupled to the rider support.

5. The ride system of claim 4, wherein the plurality of linkages are configured to move relative to one another and relative to the base to move the rider support vertically and longitudinally relative to the base.

6. The ride system of claim 1, wherein the input is received from a rider controller configured to be controlled by the rider positioned on the rider support of the selected ride vehicle.

7. The ride system of claim 6, wherein the input comprises a shift in weight, an input to a hand controller of the rider controller, or both.

8. The ride system of claim 1, comprising a ride station configured to accommodate the plurality of ride vehicles.

9. The ride system of claim 8, wherein the controller is configured to receive an input indicative of a party size and to dispatch a subset of the plurality of ride vehicles from the ride station into the ride area based at least in part on the party size, and wherein the subset of the plurality of ride vehicles comprises some or all of the ride vehicles of the plurality of ride vehicles.

10. A ride system, comprising:
one or more ride vehicles, wherein each ride vehicle of the one or more ride vehicles comprises:
a rider support configured to carry a rider;
a support actuator coupled to the rider support and to a base of the ride vehicle, wherein the support actuator is configured to move the rider support relative to the base;
a ride vehicle movement system coupled to the base and configured to move the ride vehicle to traverse a ride area; and
a roll system configured to move the rider support or the base angularly relative to the ride area;
a display system configured to provide a cinematic presentation for viewing by the rider of each ride vehicle; and
a controller configured to:
instruct the display system to provide the cinematic presentation; and
control the support actuator, the ride vehicle movement system, and the roll system of each ride vehicle of the one or more ride vehicles individually based on a choreographed routine of the one or more ride vehicles that corresponds to the cinematic presentation and an input received from a selected ride vehicle of the one or more ride vehicles, wherein the input is indicative of an adjustment to the movement of the rider support, the ride vehicle, or both, of the selected ride vehicle.

11. The ride system of claim 10, wherein the controller is configured to control the cinematic presentation based at least in part on the input received from the selected ride vehicle, and wherein the cinematic presentation comprises a plurality of unique storylines, each unique storyline of the plurality of unique storylines corresponding to a unique choreographed routine of the one or more ride vehicles.

12. The ride system of claim 10, wherein the one or more ride vehicles comprise a plurality of ride vehicles, wherein the choreographed routine comprises a designation of the selected ride vehicle of the plurality of ride vehicles based at least in part on a time sequence of the choreographed routine, and wherein the selected ride vehicle is a first ride vehicle of the plurality of ride vehicles in a first time period during the time sequence, and the selected ride vehicle is a second ride vehicle of the plurality of ride vehicles in a second time period during the time sequence.

13. The ride system of claim 10, wherein the one or more ride vehicles comprise a plurality of ride vehicles, and wherein the controller is configured to control the movement of one or more other ride vehicles of the plurality of ride vehicles different from the selected ride vehicle based at least in part on the input received from the selected ride vehicle.

14. The ride system of claim 10, comprising a ride station configured to accommodate the one or more ride vehicles, wherein the one or more ride vehicles are configured to transition from the ride station to a position proximate to a screen of the display system.

15. A ride system, comprising:
a track;
a ride vehicle configured to travel along the track, wherein the ride vehicle comprises:
a plurality of rider supports, wherein each rider support of the plurality of rider supports is configured to carry a respective rider;
a plurality of support actuators, wherein each support actuator of the plurality of support actuators is coupled to a respective rider support of the plurality of rider supports and a base of the ride vehicle, and each support actuator of the plurality of support actuators is configured to move the respective rider support relative to the base;
a ride vehicle movement system integrated with the base and configured to move the ride vehicle along the track; and
a roll system configured to move the base and the plurality of rider supports angularly relative to the track; and
a controller configured to control the plurality of support actuators, the ride vehicle movement system, and the roll system based at least in part on:
instructions, stored in memory, for performing a choreographed routine of the plurality of rider supports; and
an input received from a selected rider support of the plurality of rider supports, wherein the input is indicative of an adjustment to each support actuator of the plurality of support actuators, and wherein the input is based on a correlative adjustment to the support actuator coupled to the selected rider support.

16. The ride system of claim 15, wherein the choreographed routine comprises choreographed movement instructions for each support actuator of the plurality of support actuators, the ride vehicle movement system, and the roll system.

17. The ride system of claim 15, comprising a plurality of linkage assemblies, wherein each support actuator of the plurality of support actuators is coupled to a respective linkage assembly of the plurality of linkage assemblies and to the base of the ride vehicle, and each linkage assembly of the plurality of linkage assemblies is coupled to a respective rider support of the plurality of rider supports.

18. The ride system of claim 15, wherein the controller is configured to control movement of one or more other rider supports of the plurality of rider supports different from the selected rider support based at least in part on the input received from the selected rider support.

19. The ride system of claim 15, wherein the selected rider support comprises a rider controller configured to receive the input from a rider riding the selected rider support, and wherein the rider controller comprises a joystick, a hand controller, or both.

* * * * *